United States Patent
Li et al.

(10) Patent No.: US 11,546,771 B2
(45) Date of Patent: Jan. 3, 2023

(54) COMMUNICATION METHOD, COMMUNICATIONS APPARATUS, AND SYSTEM

(71) Applicant: HUAWEI TECHNOLOGIES CO., LTD., Shenzhen (CN)

(72) Inventors: He Li, Shanghai (CN); Yizhuang Wu, Beijing (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 16/834,858

(22) Filed: Mar. 30, 2020

(65) Prior Publication Data

US 2020/0228975 A1 Jul. 16, 2020

Related U.S. Application Data

(63) Continuation of application No. PCT/CN2018/107030, filed on Sep. 21, 2018.

(30) Foreign Application Priority Data

Sep. 30, 2017 (CN) .......................... 201710916582.1

(51) Int. Cl.
*H04W 12/37* (2021.01)
*H04W 28/02* (2009.01)
(Continued)

(52) U.S. Cl.
CPC ......... *H04W 12/37* (2021.01); *H04W 12/033* (2021.01); *H04W 12/106* (2021.01); *H04W 28/0268* (2013.01)

(58) Field of Classification Search
None
See application file for complete search history.

(56) References Cited

U.S. PATENT DOCUMENTS

2011/0271320 A1* 11/2011 Andreasen ............ H04L 63/164
726/1
2015/0143463 A1* 5/2015 Baghel ................. H04W 12/02
726/3

(Continued)

FOREIGN PATENT DOCUMENTS

CN 101232442 A 7/2008
CN 101488847 A 7/2009

(Continued)

OTHER PUBLICATIONS

ZTE Corporation,"Consideration on UP integrity configuration",3GPP TSG RAN WG2 Meeting #99bis, R2-1710314, Prague, Czech Republic, Oct. 9-13, 2017, total 3 pages.

(Continued)

*Primary Examiner* — Andre Tacdiran
(74) *Attorney, Agent, or Firm* — Hauptman Ham, LLP

(57) ABSTRACT

A communication method includes receiving, by an access network (AN) node, indication information from a mobility management device. The indication information is indicative of a security policy of a quality of service (QoS) flow. The method also includes obtaining, by the access network node based on the indication information, security information of a radio bearer corresponding to the QoS flow. The security information is indicative of a security policy of the radio bearer. The method further includes sending, by the access network node, an identifier of the radio bearer and the security information of the radio bearer to a terminal.

20 Claims, 18 Drawing Sheets

(51) Int. Cl.
  *H04W 12/033* (2021.01)
  *H04W 12/106* (2021.01)

(56) References Cited

U.S. PATENT DOCUMENTS

2018/0324633 A1* 11/2018 Lee .................. H04L 47/24
2020/0084657 A1* 3/2020 Lee .................. H04L 47/24

FOREIGN PATENT DOCUMENTS

| CN | 101599977 A | 12/2009 |
| CN | 102098676 A | 6/2011 |
| CN | 106538020 A | 3/2017 |

OTHER PUBLICATIONS

Huawei et al.,"A solution for UP security negotiation",3GPP TSG SA WG3 (Security) Meeting #87, S3-171606, May 19, 2017, Ljubljana,Slovenia, total 3 pages.

3GPP TR 33.899 V1.3.0 (Aug. 2017),3rd Generation Partnership Project;Technical Specification Group Services and System Aspects;Study on the security aspects of the next generation system(Release 14), total 604 pages.

Extended European Search Report issued in corresponding European Application No. 18861935.7, dated Sep. 11, 2020, pp. 1-10, European Patent Office, Munich, Germany.

Chinese Office Action issued in corresponding Chinese Application No. 201710916582.1, dated Oct. 30, 2020, pp. 1-9, The State Intellectual Property Office of People's Republic of China, Beijing, China.

ETRI,"TS 23.502: Updating PDU session modification for UE requested QoS control ",SA WG2 Meeting #122-bis, S2-176005,Aug. 21-25, 2017, Sophia Antipolis, France, total 4 pages.

* cited by examiner

COMMUNICATION METHOD, COMMUNICATIONS APPARATUS, AND SYSTEM

CROSS-REFERENCE TO RELATED APPLICATIONS

This application is a continuation of International Application No. PCT/CN2018/107030, filed on Sep. 21, 2018, which claims priority to Chinese Patent Application No. 201710916582.1, filed on Sep. 30, 2017. The disclosures of the aforementioned applications are hereby incorporated by reference in their entireties.

TECHNICAL FIELD

The present disclosure relates to a communications system, and in particular, to a communication method, a communications apparatus, and a system.

BACKGROUND

In a mobile communications system, to ensure security of service data transmission, an access network node performs security protection, for example, encryption protection and integrity protection, on downlink service data for a terminal, and sends the downlink service data under security protection to the terminal through an air interface between the access network node and the terminal. Correspondingly, the terminal performs security protection on uplink service data, and sends the uplink service data under security protection to the access network node through the air interface. The service data under security protection is in a security protection state during transmission through the air interface, so that interception by an attacker can be effectively prevented.

However, with evolution of the 3GPP standard, security requirements of a communications system constantly change. Therefore, security protection of service data needs to be further optimized.

SUMMARY

Embodiments of the present disclosure provide a communication method, a communications apparatus, and a system, to implement security protection based on a quality of service (QoS) flow, thereby satisfying security requirements of different services and improving flexibility of network security.

According to a first aspect, a communication method is provided. The method includes: receiving, by a session management device, a request, where the request is used to request to set up a session or modify a session; obtaining, by the session management device, a target security policy of a quality of service QoS flow based on the request; and sending, by the session management device, indication information to a mobility management device, where the indication information is used to indicate the target security policy of the QoS flow. In this way, the mobility management device sends the indication information to an access network node, and the indication information is used by the access network node to set security information of an air interface, for example, security information of a radio bearer or a QoS flow; so that different security policies can be used for different QoS flows, thereby avoiding a problem that only a same security policy can be used for a same terminal or a same session. Therefore, the use of a security policy is more flexible, and security requirements of different services are satisfied. The request may be a session setup request message or a session modification request message, or may be used to invoke a service instance. The indication information is carried in a response to the request.

With reference to the first aspect, in a first implementation of the first aspect, the indication information is used to indicate the target security policy of the QoS flow to an access network node; or the indication information includes first indication information and second indication information, the first indication information is used to indicate the target security policy of the QoS flow to an access network node, and the second indication information is used to indicate the target security policy of the QoS flow to a terminal. In the foregoing manner in which the indication information includes the first indication information and the second indication information, the terminal performs, based on the second indication information, comparison on security policy configuration information that is related to the QoS flow and that is sent by the access network node; and if a comparison result shows inconsistency, notifies a core network of the inconsistency, to ensure that security policies of the core network, the terminal, and the access network node for the QoS flow keep consistent with each other.

With reference to the first aspect, in a second implementation of the first aspect, the method further includes: sending, by the session management device, a related parameter of the QoS flow to the mobility management device. The related parameter of the QoS flow may include at least one of a QoS flow identifier QFI, a QoS class identifier QCI, a 5G QoS indicator 5QI, and an allocation/retention priority ARP. The related parameter of the QoS flow may be used by the terminal or the access network node to store a correspondence between the related parameter of the QoS flow and a security policy of the QoS flow, so that when receiving a data packet, the access network node or the terminal can quickly find, by using a related parameter of a QoS flow in the data packet, a security policy corresponding to the related parameter.

With reference to any one of the first aspect or the foregoing implementations, in a third implementation of the first aspect, the method further includes: sending, by the session management device, the related parameter of the QoS flow and the target security policy to a user plane function UPF node. In this way, when mapping service data to a corresponding QoS flow based on a service data flow (SDF) profile, the UPF node can obtain a security policy corresponding to the service data, and then add the security policy to a downlink data packet. For example, this may be applied to a scenario in which one QoS flow corresponds to a plurality of security policies.

According to a second aspect, a communication method is provided. The method includes: receiving, by an access network AN node, indication information from a mobility management device, where the indication information is used to indicate a security policy of a quality of service QoS flow; obtaining, by the access network node based on the indication information, security information of a radio bearer corresponding to the QoS flow, where the security information is used to indicate a security policy of the radio bearer, and sending, by the access network node, an identifier of the radio bearer and the security information of the radio bearer to a terminal. According to this method, the security policy of the radio bearer can be set based on the security policy of the QoS flow, so that different security policies can be executed for different QoS flows, thereby satisfying security requirements of different services.

With reference to the second aspect, in a first implementation of the second aspect, the method further includes: sending, by the access network node, at least one of the following information to the terminal: the indication information and a related parameter of the QoS flow. The indication information may be the second indication information in the first aspect. In addition, the related parameter of the QoS flow may include at least one of a QoS flow identifier QFI, a QoS class identifier QCI, a 5G QoS indicator 5QI, and an allocation/retention priority ARP.

According to a third aspect, a communication method is provided. The method includes: receiving, by a terminal, an identifier of a radio bearer, security information of the radio bearer, and indication information from an access network AN node, where the security information is used to indicate a security policy of the radio bearer, and the indication information is used to indicate a security policy of a quality of service QoS flow; and when the security policy of the radio bearer is the same as the security policy of the QoS flow, activating, by the terminal, security protection for the radio bearer based on the security information; or when the security policy of the radio bearer is different from the security policy of the QoS flow, indicating, by the terminal to a session management device, that the security policy of the radio bearer is different from the security policy of the QoS flow. Because the security policy of the radio bearer is set based on the security policy of the QoS flow, different security policies can be executed for different QoS flows, to implement security protection based on a QoS flow, thereby satisfying security requirements of different services. In addition, when the security policy of the radio bearer is different from the security policy of the QoS flow, the terminal indicates, to the session management device, that the two security policies are different, to ensure that a core network, an access network, and the terminal use a same security policy for a same QoS flow.

With reference to the third aspect, in a first implementation of the third aspect, the indicating, by the terminal to a session management device, that the security policy of the radio bearer is different from the security policy of the QoS flow includes: sending, by the terminal anomaly indication information to the session management device, where the anomaly indication information is used to indicate that the security policy of the radio bearer is different from the security policy of the QoS flow.

With reference to the third aspect or the first implementation of the third aspect, in a second implementation of the third aspect, when the security policy of the radio bearer is different from the security policy of the QoS flow, the method further includes: activating, by the terminal, security protection for the radio bearer based on the security information of the radio bearer. The terminal directly activates security protection for the radio bearer by using the security information that is of the radio bearer and that is sent by the access network node, thereby avoiding a relatively long delay caused by security policy renegotiation.

With reference to any one of the third aspect or the foregoing implementations, in a third implementation of the third aspect, the method further includes: sending, by the terminal, a security preference of the terminal to the session management device. The security preference may be used by the session management device to determine the security policy of the QoS flow, so that when the security policy of the QoS flow satisfies a service requirement, a user requirement can be further considered.

According to a fourth aspect, a communication method is provided. The method includes: receiving, by a policy control function PCF node, security policy reference information from a session management device, where the security policy reference information includes at least one of a related parameter of a quality of service QoS flow and a service-related parameter; and sending, by the PCF node, a security policy to the session management device based on the security policy reference information. The security policy is used by the session management device to determine a security policy of the QoS flow, so that different security policies can be executed for different QoS flows, to implement security protection based on a QoS flow, thereby satisfying security requirements of different services.

With reference to the fourth aspect, in a first implementation of the fourth aspect, the sending, by the PCF node, a security policy to the session management device based on the security policy reference information includes: obtaining, by the PCF node, the security policy based on a correspondence between a related parameter of the QoS flow and a security policy; or obtaining, by the PCF node, the security policy based on a correspondence between a service-related parameter and a security policy; or sending, by the PCF node, the security policy reference information to an application device, and receiving the security policy from the application device. The method may be applied to a PDU session update process. The PCF node updates the security policy, to better satisfy a security requirement of a specific service. For example, the security policy is updated based on a related parameter of a QoS flow in an updated QoS profile, or the security policy is updated based on a latest service-related parameter received from the application device. The service-related parameter may include at least one of a service type and a service identifier, for example, a voice service or a data service.

According to a fifth aspect, a communications apparatus is provided, including units or means for performing the steps in the method according to any one of the first aspect and the implementations of the first aspect. The communications apparatus may be a session management device, for example, an AMF node, or may be at least one processing element or chip.

According to a sixth aspect, a communications apparatus is provided, including units or means for performing the steps in the method according to either of the second aspect and the implementation of the second aspect. The communications apparatus may be an access network node, for example, a gNB, or may be at least one processing element or chip.

According to a seventh aspect, a communications apparatus is provided, including units or means for performing the steps in the method according to any one of the third aspect and the implementations of the third aspect. The communications apparatus may be a terminal, or may be at least one processing element or chip.

According to an eighth aspect, a communications apparatus is provided, including units or means for performing the steps in the method according to either of the fourth aspect and the implementation of the fourth aspect. The communications apparatus may be a PCF node, or may be at least one processing element or chip.

According to a ninth aspect, a communications apparatus is provided, including a processor and a memory. The memory is configured to store a program, and the processor invokes the program stored in the memory, to perform the method according to any one of the first aspect and the implementations of the first aspect. The communications apparatus may be a session management device, for example, an AMF node, or may be at least one processing element or chip.

According to a tenth aspect, a communications apparatus is provided, including a processor and a memory. The memory is configured to store a program, and the processor invokes the program stored in the memory, to perform the method according to either of the second aspect and the implementation of the second aspect. The communications apparatus may be an access network node, for example, a gNB, or may be at least one processing element or chip.

According to an eleventh aspect, a communications apparatus is provided, including a processor and a memory. The memory is configured to store a program, and the processor invokes the program stored in the memory, to perform the method according to any one of the third aspect and the implementations of the third aspect. The communications apparatus may be a terminal, or may be at least one processing element or chip.

According to a twelfth aspect, a communications apparatus is provided, including a processor and a memory. The memory is configured to store a program, and the processor invokes the program stored in the memory, to perform the method according to either of the fourth aspect and the implementation of the fourth aspect. The communications apparatus may be a PCF node, or may be at least one processing element or chip.

According to a thirteenth aspect, a program is provided, where the program is used to perform the method according to any one of the first aspect and the implementations of the first aspect when being executed by a processor.

According to a fourteenth aspect, a computer readable storage medium is provided, including the program in the thirteenth aspect.

According to a fifteenth aspect, a program is provided, where the program is used to perform the method according to any one of the second aspect and the implementations of the second aspect when being executed by a processor.

According to a sixteenth aspect, a computer readable storage medium is provided, including the program in the fifteenth aspect.

According to a seventeenth aspect, a program is provided, where the program is used to perform the method according to any one of the third aspect implementations of the third aspect when being executed by a processor.

According to an eighteenth aspect, a computer readable storage medium is provided, including the program in the seventeenth aspect.

According to a nineteenth aspect, a program is provided, where the program is used to perform the method according to any of the the fourth aspect implementations of the fourth aspect when being executed by a processor.

According to a twentieth aspect, a computer readable storage medium is provided, including the program in the nineteenth aspect.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
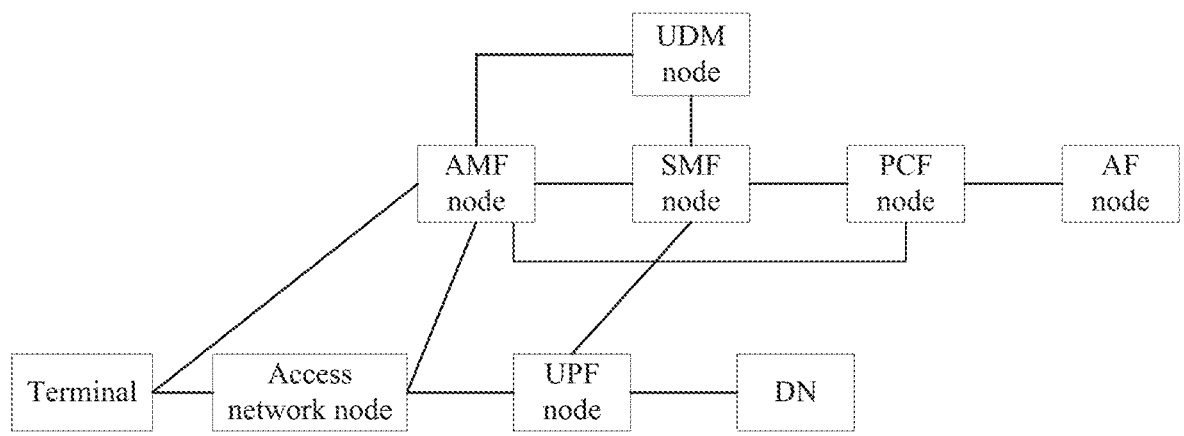
FIG. 1 is a network structure diagram.

The following describes the technical solutions in the embodiments of the present disclosure with reference to the accompanying drawings in the embodiments of the present disclosure. FIG. 1 provides a network structure. The network structure may be applied to a next-generation communications system. Components of the network structure are briefly described as follows:

A terminal may include a handheld device with a wireless communication function, a vehicle-mounted device, a wearable device, a computing device, another processing device connected to a wireless modem, various forms of terminals, a mobile station (MS), user equipment (UE), a soft terminal, or the like, for example, a water meter, an electricity meter, or a sensor.

An access network node is similar to a base station in a conventional network, provides a network access function for an authorized user in a specific area, and can use transmission tunnels of different quality based on a user level, a service requirement, or the like. The access network node can manage a radio resource and provide an access service for a terminal device, to forward a control signal and user data between the terminal device and a core network.

An access and mobility management function (AMF) node is responsible for mobility management, access management, and the like, and may be configured to implement a function other than session management in functions of a mobility management entity (MME).

A session management function (SMF) node sets up a session for a terminal device, allocates a session identifier (ID), and manages or terminates the session.

A user plane function (UPF) node provides functions such as session and bearer management and IP address allocation.

A policy control function (PCF) node allocates a security policy to a network entity (for example, an access network node or a UPF node).

A data network (DN) provides an external data network service.

An application function (AF) node provides an application layer service.

A unified device management (UDM) node stores subscription information of a user.

As shown in FIG. 1, the components communicate with each other along a next generation (NG) path. For example, the access network node communicates with the UPF node along an NG 3 path. In addition, the SMF node and the AMF node may be integrated into one physical device, or may be distributed on different physical devices. This is not specifically limited in this application.

It should be noted that, in this application, a session management device may be the SMF node shown in FIG. 1, or another device having a similar or same function; a PCF node may be the PCF node shown in FIG. 1, or another device having a similar or same function; a mobility management device may be the AMF node shown in FIG. 1, or another device having a similar or same function; and a UDM node may be the UDM node shown in FIG. 1, or another device having a similar or same function. This is not limited.

In addition, methods or apparatuses mentioned in the embodiments of this application are all applicable to communications systems of different radio access technologies, for example, a 4G communications system, a 5G communications system, or another subsequent evolved communications system. This is not limited.

It should be noted that examples mentioned in this application do not represent the optimal; "first", "second", and the like mentioned in this application are merely used to distinguish between different information, messages, or other objects, and do not represent a sequence relationship; and mutual reference may be made to the embodiments in this application. For same or similar steps or terms, details are not described again.

Figure 2:
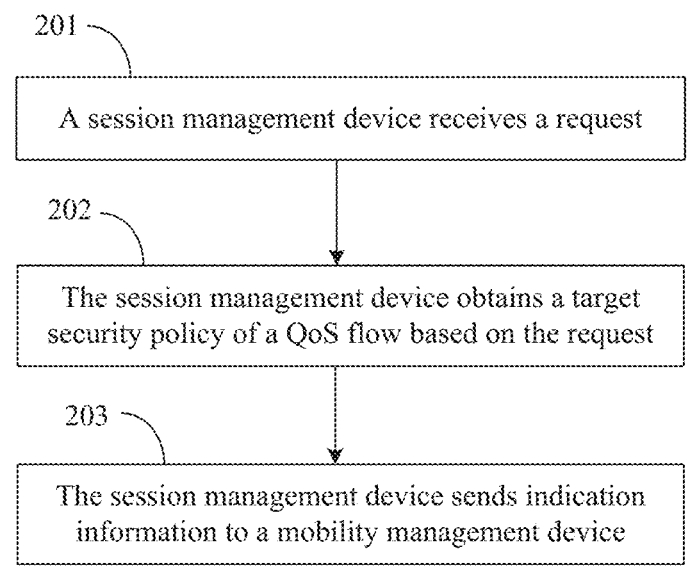
FIG. 2 is a flowchart of a communication method according to an embodiment of this application.

As shown in FIG. 2, an embodiment of this application provides a communication method. The method is specifically described below.

201. A session management device receives a request.

The request may be used to request to set up a session or modify a session. Specifically, the request may be a message, for example, a session setup request or a session modification request. In addition, the request may be sent in a servitization manner.

For example, a mobility management device receives a first packet data unit (PDU) session setup request from a terminal, and sends a second PDU session setup request to the session management device based on the request. The first PDU session setup request and the second PDU session setup request may be the same or different. This is not limited.

For another example, the session management device receives a request from a PCF node. The request may be, for example, a session modification request used to request to modify a session.

202. The session management device obtains a target security policy of a quality of service (QoS) flow based on the request.

The target security policy may include: enabling user plane encryption protection and enabling user plane integrity protection; enabling user plane encryption protection and not enabling user plane integrity protection; enabling user plane integrity protection and not enabling user plane encryption protection; or not enabling user plane encryption protection and not enabling user plane integrity protection.

In addition, the target security policy of the QoS flow may be a security policy that is of the QoS flow and that is configured for or sent to an access network node by a core network, namely, a security policy that is of the QoS flow and that is expected by the core network, so that the access network node configures a security policy of an air interface, for example, a security policy of a radio bearer or a security policy of an air interface QoS flow.

Specifically, the target security policy may be expressed in a form of an identifier. The identifier may be a preset character, character string, or value, and values of different identifiers may represent different security policies. For example, the identifier is a 2-bit value. When the identifier is set to 00, it indicates that the target security policy is not enabling user plane encryption protection and not enabling user plane integrity protection (this may be referred to as a security policy #0). When the identifier is set to 01, it indicates that the target security policy is enabling user plane integrity protection and not enabling user plane encryption protection (this may be referred to as a security policy #1). When the identifier is set to 10, it indicates that the target security policy is enabling user plane encryption protection and not enabling user plane integrity protection (this may be referred to as a security policy #2). When the identifier is set to 11, it indicates that the target security policy is enabling user plane encryption protection and enabling user plane integrity protection (this may be referred to as a security policy #3).

It should be noted that the target security policy of the QoS flow may include at least one of the security policies #0 to #3. For example, if the target security policy includes one security policy, and the QoS flow is used to transmit data of at least two services, it may indicate that security policies of all services transmitted by using the QoS flow may be the same. If the target security policy includes one security policy, and the QoS flow is used to transmit only one service, it indicates that the security policy of the QoS flow is a security policy of the service. If the target security policy includes two or more security policies, and the QoS flow is used to transmit data of at least two services, it indicates that security policies of at least two of services transmitted by using the QoS flow are different. If the target security policy includes two or more security policies, and the QoS flow is used to transmit data of only one service, it indicates that different security policies may be used for the service. Specifically, an occasion on which different security policies are used may be determined based on a status of an access network.

The request in step 202 may be used as a trigger condition for obtaining the target security policy of the QoS flow, or the target security policy of the QoS flow may be obtained based on information carried in the request. For example, the following manners may be used.

Manner 1: The session management device obtains the target security policy based on a correspondence between a related parameter of the QoS flow and a security policy.

The related parameter of the QoS flow may include at least one of a QoS flow identifier (QFI), a QoS class identifier (QCI), a 5G QoS indicator (5QI), and an allocation/retention priority (ARP). Apparently, the related parameter may alternatively be another parameter used to identify the QoS flow. This is not limited. Specifically, the QFI may be an identifier allocated by the session management device to identify a QoS profile.

For example, the related parameter of the QoS flow may be a 5QI, a QCI, or an ARP in a default QoS profile, may be a QFI used to identify the default QoS profile, may be a 5QI a QCI, or an ARP in a QoS profile provided by a policy control function (PCF) node, or may be a QFI used to identify the QoS profile provided by the PCF node.

The default QoS profile may be obtained from subscription information of the terminal. For example, an identifier of the terminal is carried in the foregoing request, and the default QoS profile is obtained, based on the identifier of the terminal, from the subscription information that is of the terminal and that is stored by a UDM node. The identifier of the terminal may be used to identify the terminal. This belongs to the prior art, and details are not described.

The QoS profile provided by the PCF node may be obtained based on a service-related parameter of the terminal. Specifically, the service-related parameter may include at least one of the following: a service type (for example, a voice service or a mobile data service), a service identifier (for example, a service IP address, a service port number, or an application identifier), a service characteristic (for example, a small data service or a broadband service), and an air interface device configured to perform a service (for example, a 3GPP access device or a non-3GPP access device). The service type may be carried in the foregoing request.

Manner 2: The session management device receives the target security policy from a UDM node.

A correspondence between a related parameter of the QoS flow and a security policy is stored in the UDM node. The correspondence may be pre-configured in the UDM node, or may be dynamically sent by another core network device to the UDM node.

In an example, the UDM node obtains an identifier of the terminal from the session management device, and obtains a default QoS profile of the terminal based on the identifier of the terminal. Then, the UDM node obtains, based on a related parameter of the QoS flow in the default QoS profile, a security policy corresponding to the related parameter of the QoS flow. Finally, the UDM node uses the obtained security policy as the target security policy and sends the target security policy to the session management device. The related parameter of the QoS flow may be a 5QL a QCL or an ARP. This is not limited.

In another example, the UDM node obtains a related parameter of the QoS flow from the session management device, then obtains a security policy based on the stored correspondence between a related parameter of the QoS flow and a security policy, uses the obtained security policy as the target security policy, and sends the target security policy to the session management device.

Manner 3: The session management device obtains a first security policy based on a correspondence between a related parameter of the QoS flow and a security policy, and obtains the target security policy based on the first security policy.

The correspondence between a related parameter of the QoS flow and a security policy is stored in the session management device. The correspondence may be pre-configured in the session management device, or may be dynamically sent by another core network device to the session management device.

In an example, the session management device first obtains a related parameter of the QoS flow by using the method in the manner 1, and obtains, based on the correspondence between a related parameter of the QoS flow and a security policy, a security policy corresponding to the related parameter of the QoS flow; where the obtained security policy may be referred to as the first security policy. Then, the session management device obtains the target security policy based on the first security policy and a security preference of the terminal. For example, if the first security policy is enabling user plane encryption protection and not enabling user plane integrity protection, and the security preference is enabling user plane integrity protection and not enabling user plane encryption protection, the target security policy may be enabling user plane encryption protection and enabling user plane integrity protection.

The security preference may be used to indicate a security policy expected by the terminal or a security policy required by the terminal. For details, refer to a related description of the security preference in this application. The security preference may be carried in the request. This is not limited.

Manner 4: The session management device receives, from a UDM node, a first security policy corresponding to a related parameter of the QoS flow, and obtains the target security policy based on the first security policy.

The related parameter of the QoS flow may be obtained by using the method provided in the manner 1. The UDM node may obtain the first security policy by using the method provided in the manner 3, and send the obtained first security policy to the session management device.

Manner 5: The session management device sends a related parameter of the QoS flow to a PCF node, and receives the target security policy from the PCF node.

In a first example, the PCF node stores a correspondence between a related parameter of the QoS flow and a security policy. After receiving the related parameter of the QoS flow, the PCF node obtains, based on the related parameter of the QoS flow, a security policy corresponding to the related parameter of the QoS flow, uses the obtained security policy as the target security policy, and sends the target security policy to the session management device.

In a second example, the PCF node receives a service requirement (for example, a packet loss rate requirement, a delay requirement, a security requirement, or a bit error rate requirement) of the terminal from another device (for example, an AF node or a network capability exposure functional entity). The PCF node may determine, based on the service requirement, a security policy used for the QoS flow, use the security policy of the QoS flow as the target security policy, and send the target security policy to the session management device. The packet loss rate requirement may be that a packet loss rate is not higher than a preset packet loss rate threshold, the delay requirement may be that a delay time is not longer than a preset delay threshold, the security requirement may be enabling user plane encryption protection or user plane integrity protection, or enabling both user plane encryption protection and user plane integrity protection, and the bit error rate requirement may be that a bit error rate is not higher than a preset bit error rate threshold.

Apparently, the first example and the second example may be combined. Details are not described.

Manner 6: The request carries a service-related parameter of the terminal, and the session management device sends the service-related parameter to a PCF node and receives the target security policy from the PCF node.

The service-related parameter may be a service type or a service identifier (for example, a service IP address, a service port number, or an application identifier (APP ID)). For details, refer to the foregoing description. This is not limited.

Specifically, the PCF node may store a correspondence between a service-related parameter and a security policy. For example, for a voice service, user plane integrity protection is not enabled and a corresponding security policy is enabling user plane encryption protection. For a live video stream, a corresponding security policy is not enabling user plane integrity protection and not enabling user plane encryption protection. For a non-live video stream, a corresponding security policy is enabling user plane integrity protection and enabling user plane encryption protection. For an Internet of vehicles service, a corresponding security policy is enabling user plane encryption protection and not enabling user plane integrity protection. For another example, if a service modification parameter is an APP ID, when a service indicated by the APP ID is WeChat, user plane encryption protection is enabled but user plane integrity protection is not enabled. This is not limited.

Optionally, obtaining the target security policy based on the first security policy that is mentioned in the manner 3 and the manner 4 is implemented in the following three manners:

Manner a: The session management device determines the target security policy based on a security preference of the terminal and the first security policy.

The security preference may be used to indicate a security policy expected by the terminal or a security policy required by the terminal. This is not limited. The security policy may include the foregoing security policy #0, security policy #1, security policy #2, or security policy #3. Specifically, for the security policy and an expression form of the security policy, refer to the related description of the target security policy. Details are not described again.

In addition, the security preference of the terminal may be sent by the terminal to the session management device through the access network node and the mobility management device, and for example, may be carried in the foregoing request.

Specifically, when the security policy indicated by the security preference is different from the first security policy, the target security policy may be determined based on a pre-configured priority (for example, a priority configured by an operator). For example, if a security policy obtained by the core network has a higher priority than that indicated by the security preference of the terminal, the target security policy is the first security policy.

Manner b: The session management device sends the first security policy and the related parameter of the QoS flow to a PCF node, and receives the target security policy from the PCF node.

Specifically, the PCF node may obtain a second security policy based on the received related parameter of the QoS flow, then determine the target security policy based on a pre-configured priority, the first security policy, and the second security policy, and send the target security policy to the session management device. For obtaining of the second security policy based on the received related parameter of the QoS flow, refer to the method of obtaining the target security policy by the PCF node in the manner 5. Details are not described again.

Manner c: The session management device receives, from a PCF node, a second security policy corresponding to the related parameter of the QoS flow, and determines the target security policy based on the second security policy and the first security policy.

Specifically, the session management device may send the related parameter of the QoS flow to the PCF node. After receiving the related parameter of the QoS flow, the PCF node may obtain, by using the method provided in the manner 5, the second security policy corresponding to the related parameter of the QoS flow, and send the second security policy to the session management device. After receiving the second security policy, the session management device determines the target security policy based on a pre-configured priority, the first security policy, and the second security policy. For example, if the pre-configured priority indicates that the second security policy obtained by the PCF node has a highest priority, the second security policy is used as the target security policy.

Apparently, the manner a and the manner c may be combined. For example, the target security policy is selected based on the pre-configured priority, the security preference of the terminal, the first security policy, and the second security policy. This is not limited.

It should be noted that for the first security policy, the second security policy, the security policy, and the like that are designed in this application, refer to the related description of the target security policy. Details are not described again.

In addition, when the manner 1 or the manner 3 is used, the method may further include: receiving, by the session management device, the correspondence between a related parameter of the QoS flow and a security policy. Apparently, the correspondence between a related parameter of the QoS flow and a security policy may be alternatively preset in the session management device. This is not limited.

203. The session management device sends indication information to the mobility management device.

The indication information may be used to indicate the target security policy of the QoS flow. The indication information may be the target security policy or a security algorithm, or may be a correspondence between a related parameter of the QoS flow and a target security policy or a correspondence between a related parameter of the QoS flow and a security algorithm. This is not limited.

In an example, the indication information is the target security policy, and reference may be made to the description of the expression form of the target security policy in step 202. Specifically, the target security policy is expressed in a form of two bits. When a value of the two bits is 01, it indicates that user plane encryption protection is not enabled and user plane integrity protection is enabled. When a value of the two bits is 10, it indicates that user plane encryption protection is enabled and user plane integrity protection is not enabled. When a value of the two bits is 11, it indicates that user plane encryption protection is enabled and user plane integrity protection is enabled.

In another example, the indication information may be the security algorithm, and the security algorithm may be expressed in a form of an algorithm identifier. For example, when the algorithm identifier is one or more of 128-NEA1, 128-NEA2, and 128-NEA3, it indicates that user plane encryption protection is enabled. When the algorithm identifier is one or more of 128-NIA1, 128-NIA2, and 128-NIA3, it indicates that user plane integrity protection is enabled. When the algorithm identifier is NEA0 or there is no encryption algorithm identifier, it indicates that user plane encryption protection is not enabled. When the algorithm identifier is NIA0 or there is no integrity protection algorithm identifier, it indicates that user plane integrity protection is not enabled. When the algorithm identifier is a specific indicator (for example, each element of the indicator is 1), specific security protection that is not enabled may be determined based on a location at which the specific indicator appears. For example, if algorithm identifiers are "1111" and 128-NEA1, it may be determined based on NEA1 that user plane encryption protection is enabled, and determined based on "1111" that user plane integrity protection is not enabled. For another example, when algorithm identifiers are "1111" and "1111", it indicates that neither user plane encryption protection nor user plane integrity protection is enabled.

In still another example, the indication information is the correspondence between a related parameter of the QoS flow and a target security policy. For example, (a related parameter (for example, QFI=2) of the QoS flow, a security policy #1) indicates that a target security policy that is of the QoS flow and that is indicated by the related parameter of the QoS flow is the security policy #1. For another example, (a related parameter (for example, QFI=1) of the QoS flow, a security policy #1, a security policy #2) indicates that target security policies of the QoS flow that are indicated by the related parameter of the QoS flow are the security policy #1 and the security policy #2. For the security policy #1, the security policy #2, and expression forms thereof, refer to the foregoing related description of the target security policy. Details are not described again.

Specifically, the indication information may be used to indicate the target security policy of the QoS flow to the access network node. Alternatively, the indication information may include first indication information and second indication information, the first indication information may be used to indicate the target security policy of the QoS flow to the access network node, and the second indication information may be used to indicate the target security policy of the QoS flow to the terminal. For the first indication information and the second indication information, refer to the foregoing related description of the indication information. Details are not described again.

Correspondingly, after receiving the indication information, the mobility management device sends the indication information to the access network node. The indication information may be carried in a response, and the response may be used to respond to the foregoing request. For example, the mobility management device may directly send the response to the access network node, or may encapsulate the indication information into another message (for example, a PDU session resource modification message or a PDU session resource setup request message) and send the message to the access network node. This is not limited.

The response may be a PDU session setup-SM context response message or a PDU session modification response message, or may be implemented through servitization.

For example, when the response is the PDU session setup-SM context response, the mobility management device may send the indication information by using the PDU session resource setup request message; or when the response is the PDU session modification response message, the mobility management device may send the indication information by using the PDU session resource modification message.

According to the method provided in the foregoing embodiment, the session management device receives the request, obtains the target security policy of the QoS flow based on the request, and sends, to the mobility management device, the indication information used to indicate the target security policy of the QoS flow where the indication information is used to set security information of an air interface, for example, security information of a radio bearer or the QoS flow In this way, different security policies can be used for different QoS flows, to avoid a problem that only a same security policy can be used for a same terminal or a same session, thereby satisfying security requirements of different services.

Optionally, in an implementation scenario of the foregoing embodiment, the method further includes: sending, by the session management device, the related parameter of the QoS flow to the mobility management device.

Correspondingly, the mobility management device may send the related parameter of the QoS flow to the access network node. Further, the access network node may send the related parameter of the QoS flow to the terminal. Then, the terminal or the access network node can find, based on the related parameter of the QoS flow, a bearer corresponding to the QoS flow or a security policy corresponding to the QoS flow.

The related parameter of the QoS flow and the indication information in step 203 may be carried in a same message for sending, or may be sent separately. This is not limited.

Optionally, in another implementation scenario of the foregoing embodiment, the method further includes: sending, by the session management device, the security preference of the terminal to the mobility management device.

Correspondingly, the mobility management device may send the security preference of the terminal to the terminal through the access network node, so that the terminal checks the security preference, thereby ensuring correctness of the security preference received on a network side and avoiding a security risk caused when the security preference is tampered with.

Optionally, in still another implementation scenario of the foregoing embodiment, the method further includes:

sending, by the session management device, the related parameter of the QoS flow and the target security policy to a UPF node.

It should be noted that the security policy of the QoS flow may include at least one security policy. Specifically, the UPF node may instruct, based on a difference between service data transmitted by one QoS flow, the access network node to use different security policies. For example, when instant voice service data is transmitted by using the QoS flow, the security policy of QoS may be enabling user plane integrity protection and not enabling user plane encryption protection. The UPF node may add the security policy to a header of a downlink data packet that carries the instant voice service data, so that different security policies can be used for different services carried in a same QoS flow.

Figure 3:
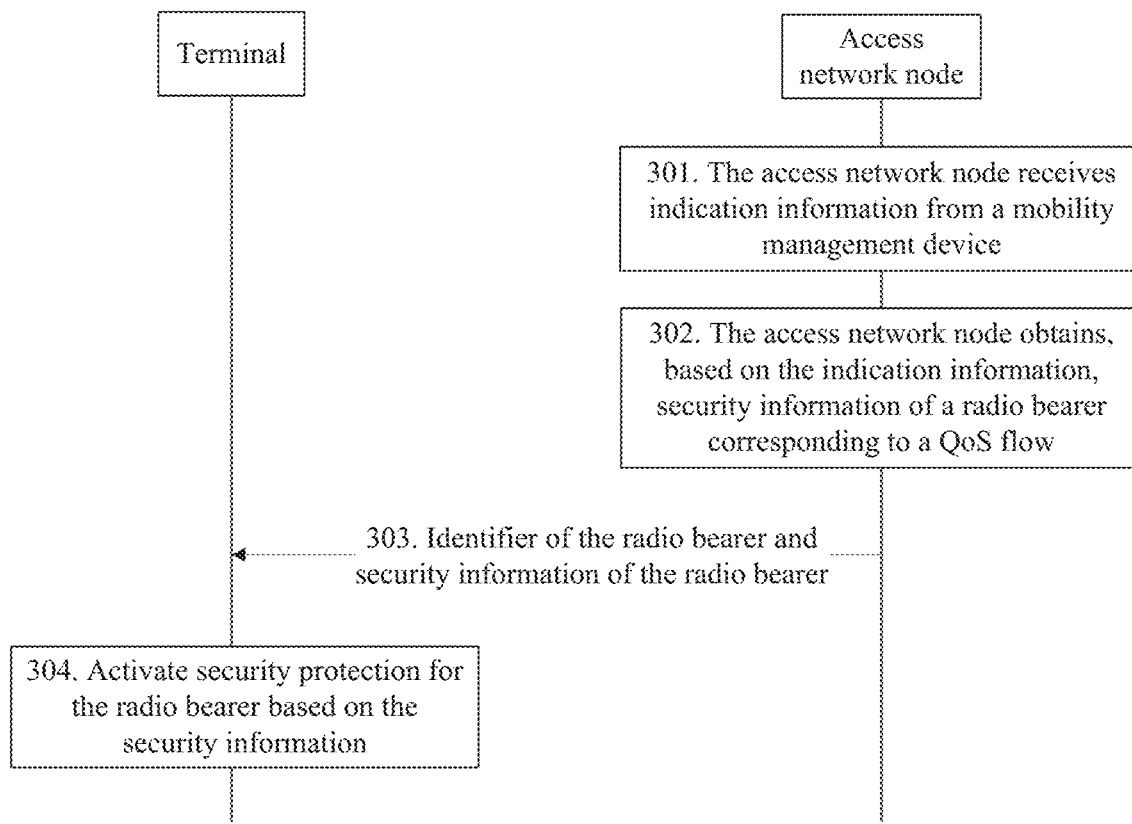
FIG. 3 is a flowchart of another communication method according to an embodiment of this application.

As shown in FIG. 3, an embodiment of this application provides another communication method. The method is specifically described below.

301. An access network node receives indication information from a mobility management device.

The indication information may be carried in a request, and the request may be used to modify a session or set up a session. The request may be a message. For example, the request may be a PDU session resource modification message or a PDU session resource setup request message. The request may alternatively be a request sent in a servitization form, in other words, the request is used to request servitization.

The indication information may be used to indicate a security policy of a QoS flow. In addition, the indication information may be obtained by the mobility management device from a session management device. For details, refer to the related description of the indication information in the implementation shown in FIG. 2. This is not limited.

Specifically, the indication information may be used to indicate a target security policy of the QoS flow to the access network node; or the indication information includes first indication information and second indication information, the first indication information is used to indicate a target security policy of the QoS flow to the access network node, and the second indication information is used to indicate the target security policy of the QoS flow to a terminal.

302. The access network node obtains, based on the indication information, security information of a radio bearer corresponding to the QoS flow.

The security information may be used to indicate a security policy of the radio bearer. The security policy of the radio bearer may include one or more security policies, for example, a security policy #1 and a security policy #2. For details, refer to the related description of the target security policy mentioned in the embodiment shown in FIG. 2. Details are not described again. For example, the security policy of the radio bearer may include: enabling user plane encryption protection and enabling user plane integrity protection; enabling user plane encryption protection and not enabling user plane integrity protection; enabling user plane integrity protection and not enabling user plane encryption protection; or not enabling user plane encryption protection and not enabling user plane integrity protection.

Specifically, the security information may include a security policy or a security algorithm. The security policy may be represented by using a byte or a bit. In other words, different security policies may be represented by setting the byte or the bit to different values. For example, two bits are used. When a value of the two bits is 01, it indicates that user plane encryption protection is not enabled and user plane integrity protection is enabled. When a value of the two bits is 10, it indicates that user plane encryption protection is enabled and user plane integrity protection is not enabled. When a value of the two bits is 11, it indicates that user plane encryption protection is enabled and user plane integrity protection is enabled.

The security algorithm may include at least one of an encryption algorithm and an integrity protection algorithm. For example, when the security algorithm includes only the encryption algorithm, the security algorithm may be used to indicate that the security policy is enabling user plane encryption protection and not enabling user plane integrity protection. When the security algorithm includes only the integrity protection algorithm, the security algorithm may be used to indicate that the security policy is enabling user plane integrity protection and not enabling user plane encryption protection. When the security algorithm includes both the encryption algorithm and the integrity protection algorithm, the security algorithm may be used to indicate that the security policy is enabling user plane encryption protection and enabling user plane integrity protection. The encryption algorithm may be one or more of 128-NEA1, 128-NEA2, and 128-NEA3.

Specifically, the access network node may obtain the security information of the radio bearer based on the indication information and a status of the access network node. The status of the access network node may include load, a security capability, or the like of the access network node. This is not limited.

In an example, when the indication information is used to indicate that the security policy of the QoS flow is enabling user plane encryption protection and enabling user plane integrity protection, but the load of the access network node exceeds a preset threshold, the security policy of the radio bearer may be enabling user plane encryption protection and not enabling user plane integrity protection; enabling user plane integrity protection and not enabling user plane encryption protection; or not enabling user plane encryption protection and not enabling user plane integrity protection.

In another example, when the indication information is used to indicate that security policies of the QoS flow include the security policy #2 and a security policy #3, and a security policy preferred by the access network node is the security policy #3, the security policy of the radio bearer may be the security policy #3.

In still another example, when the indication information is used to indicate that security policies of the QoS flow include the security policy #2 and a security policy #3, and the security policy #2 is used to be executed in a preset scenario (for example, a preset time period or a preset network status), the security policy of the radio bearer may be the security policy #2 and the security policy #3.

The radio bearer corresponding to the QoS flow may be a radio bearer used to transmit the QoS flow. The radio bearer may be a radio bearer newly established by the access network node for the QoS flow, or may be an established radio bearer. In other words, the QoS flow may reuse an old radio bearer. For details, refer to a related description of an implementation scenario of this embodiment.

In addition, the radio bearer may be a data radio bearer (DRB). Correspondingly, an identifier of the radio bearer is a DRB identifier (ID).

It should be noted that, for the security policy mentioned in this embodiment, refer to the related description of the target security policy in the embodiment shown in FIG. 2. Details are not described again.

303. The access network node sends the identifier of the radio bearer and the security information of the radio bearer to the terminal.

For example, the access network node sends an RRC message to the terminal, where the RRC message carries the identifier of the radio bearer and the security information of the radio bearer.

304. The terminal receives the identifier of the radio bearer and the security information of the radio bearer from the access network node, and activates security protection for the radio bearer based on the security information.

Activating security protection for the radio bearer may include: generating a related key based on a security algorithm of the radio bearer, so as to perform security protection on service data transmitted on the radio bearer.

For example, when the security information is a security algorithm, a related key may be generated based on the security algorithm; or when the security information is a security policy, a security algorithm may be obtained based on the security policy, and then a related key is generated based on the security algorithm.

According to the method provided in the foregoing embodiment, the access network node obtains, based on the indication information used to indicate the security policy of the QoS flow, the security information of the radio bearer corresponding to the QoS flow. In this way, the security policy of the radio bearer can be set based on the security policy of the QoS flow, to implement security protection based on the QoS flow, so that different security policies can be executed for different QoS flows, thereby satisfying security requirements of different services and improving flexibility of network security.

Figure 3A:
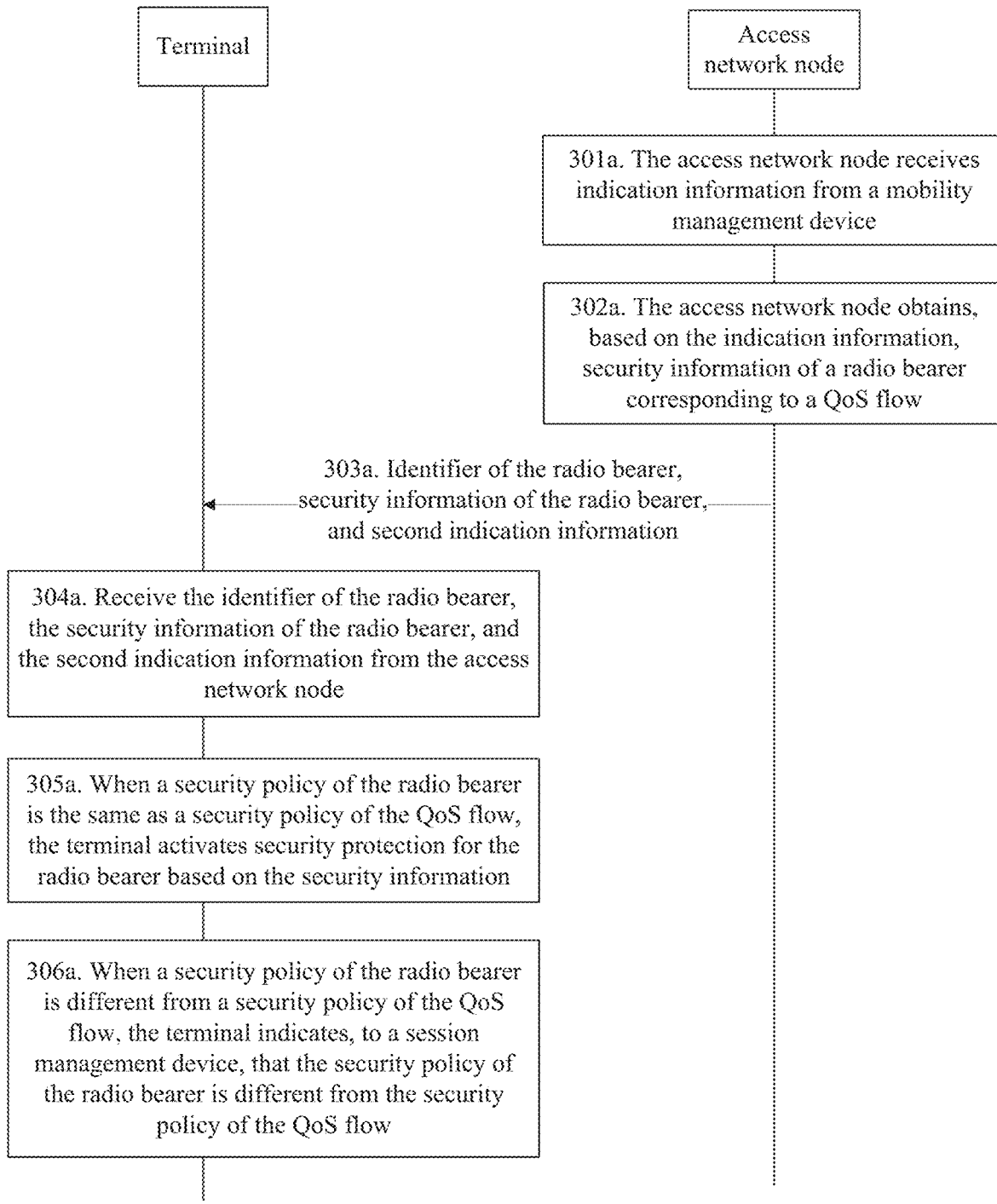
FIG. 3a is a flowchart of another communication method according to an embodiment of this application.

As shown in FIG. 3a, an embodiment of this application provides another communication method. The method is specifically described below 301a. An access network node receives indication information from a mobility management device.

302a. The access network node obtains, based on the indication information, security information of a radio bearer corresponding to a QoS flow.

For step 301a and step 302a, respectively refer to step 301 and step 302 in the embodiment shown in FIG. 3. Details are not described again.

In addition, the indication information in step 301a includes second indication information.

303a. The access network node sends an identifier of the radio bearer, the security information of the radio bearer, and the second indication information to a terminal.

304a. The terminal receives the identifier of the radio bearer, the security information of the radio bearer, and the second indication information from the access network node.

Further, after step 304a, the method further includes step 305a or step 306a.

305a. When a security policy of the radio bearer is the same as a security policy of the QoS flow, the terminal activates security protection for the radio bearer based on the security information.

Activating security protection for the radio bearer may include: generating a related key based on a security algorithm of the radio bearer, so as to perform security protection on service data transmitted on the radio bearer.

306a. When a security policy of the radio bearer is different from a security policy of the QoS flow, the terminal indicates, to a session management device, that the security policy of the radio bearer is different from the security policy of the QoS flow.

In an example, the terminal may send anomaly indication information to the session management device, and the anomaly indication information is used to indicate that the security policy of the radio bearer is different from the security policy of the QoS flow.

The anomaly indication information may include a related parameter of the QoS flow, or a related parameter of the QoS flow and the security policy of the radio bearer. This is not limited.

Optionally, when the security policy of the radio bearer is different from the security policy of the QoS flow, the method further includes:

activating, by the terminal, security protection for the radio bearer based on the security information of the radio bearer.

For activation of the security protection for the radio bearer, refer to the related description in step 305a. Details are not described again.

In an example, when the security policy of the radio bearer is enabling user plane encryption protection and not enabling user plane integrity protection, the terminal activates encryption protection for the radio bearer; or when the security policy of the radio bearer is enabling user plane encryption protection and enabling user plane integrity protection, the terminal activates encryption protection and integrity protection for the radio bearer.

Optionally, in step 306a, that the terminal indicates, to the session management device, that the security policy of the radio bearer is different from the security policy of the QoS flow may be replaced with that the terminal breaks a connection to the base station. This is not limited.

According to the method provided in the foregoing embodiment, the access network node obtains, based on the indication information used to indicate the security policy of the QoS flow, the security information of the radio bearer corresponding to the QoS flow. When the security policy of the radio bearer is the same as the security policy of the QoS flow, the terminal activates security protection for the radio bearer. In this way, the security policy of the radio bearer can be set based on the security policy of the QoS flow, so that different security policies can be executed for different QoS flows, to implement security protection based on a QoS flow, thereby satisfying security requirements of different services. Alternatively, when the security policy of the radio bearer is different from the security policy of the QoS flow, the terminal indicates, to the session management device, that the two security policies are different, thereby ensuring that a core network, an access network and the terminal use a same security policy for a same QoS flow.

Optionally, in an implementation scenario of the embodiment shown in FIG. 3 or FIG. 3a, the method further includes the following step.

310. The terminal sends a security preference of the terminal to the session management device.

For the security preference, refer to the related description in the embodiment shown in FIG. 2. Details are not described again.

It should be noted that, the security preference of the terminal may be used by the session management device to obtain the security policy of the QoS flow, so that the security policy of the QoS flow can more effectively satisfy a user's requirement.

Further, the method may include the following step.

320. The terminal obtains the security preference of the terminal based on security preference reference information of the terminal.

The security preference reference information may include at least one of the following: an access point name (APN) of the terminal, service-related information of the terminal, a quality of service requirement of the terminal, a network status of the terminal, subscription information of the terminal, and a status of the terminal.

Specifically, the subscription information of the terminal may include the security preference of the terminal, and the terminal may obtain the subscription information from a network side.

The APN may be used to identify a network accessed by the terminal. The network can provide a service for the terminal. For example, the APN may be an IP address or a character string. This is not limited.

In an example, the terminal may preset different security preferences based on different APNs or service types. For example, it is assumed that the APN is an IP address of an IP multimedia subsystem (IMS) network, or an IP address of a gateway for accessing an IMS network, or a name of an IMS network, and the IMS network can provide a VoIP (Voice over IP) service for the terminal. In this case, the security preference of the terminal may be enabling user plane encryption protection and not enabling user plane integrity protection. It is assumed that the APN is an IP address of the Internet or an IP address of a gateway for accessing the Internet, the Internet can provide a service such as network access for a user. In this case, the security preference of the terminal may be enabling user plane integrity protection and enabling user plane encryption protection.

In another example, a user may set the security preference of the terminal through a man-machine interaction interface, or an operator may provide several security preferences, so that a user selects a security preference during subscription.

Specifically, the network status of the terminal may include: a network anomaly or network sharing. Specifically, the network anomaly may be network overload, a network connection anomaly, network congestion, or the like. The network sharing may be that a plurality of operators share one access network node.

In an example, when the network is congested, the security preference of the terminal may be used to instruct a network side to continue performing current user plane security protection, or may be used to require a network side to disable current user plane security protection.

In another example, if the network accessed by the terminal is a shared network, the security preference of the terminal may be not enabling user plane encryption protection and not enabling user plane integrity protection.

Specifically, the status of the terminal may include: the terminal is in arrears or is roaming, or the terminal is used as a relay device.

In an example, it is assumed that the terminal is roaming. In this case, the security preference of the terminal may be not enabling user plane encryption protection and not enabling user plane integrity protection.

Specifically, the service-related information may include a service type, a service port number, or a service requirement. Specifically, the service requirement may be an application requirement. For example, if application-layer security protection is enabled for an application accessed by the terminal, the session management device may determine, based on the application requirement, not to enable QoS flow security protection.

In an example, if the service type of the terminal is a VoIP service, the security preference of the terminal may be not enabling user plane encryption protection and not enabling user plane integrity protection. If the service type of the terminal is a short message service (SMS), the security preference of the terminal may be enabling user plane encryption protection and enabling user plane integrity protection.

Optionally, in another implementation scenario of the embodiment shown in FIG. 3 or FIG. 3a, the method further includes step 330 and step 340, or step 330 and step 350.

330. The terminal receives a security preference of the terminal from the access network node.

340. When the security preference that is of the terminal and that is from the access network node is different from a security preference stored by the terminal, the terminal breaks a connection to a network.

Specifically, the terminal may break the connection to the network after sending notification information to the access network node. The notification information is used to notify that the security preference of the terminal is tampered with.

350. When the security preference that is of the terminal and that is from the access network node is the same as a security preference stored by the terminal, the terminal continues to perform a subsequent operation.

Specifically, the subsequent operation may be performing security protection on service data, or activating, by the terminal, security protection for the radio bearer based on the security information in step 304 or step 305a. This is not limited.

Optionally, in still another implementation scenario of the embodiment shown in FIG. 3 or FIG. 3a, the method further includes the following steps.

306. The access network node receives a downlink data packet from a UPF node, where the downlink data packet carries a related parameter of the QoS flow.

307. The access network node obtains, based on the related parameter of the QoS flow, a radio bearer corresponding to the QoS flow, and performs security protection on service data in the downlink data packet based on a security policy of the radio bearer.

308. The access network node sends service data obtained after the security protection to the terminal by using the radio bearer.

309. The terminal receives, from the access network node, the service data obtained after the security protection, and obtains the security policy of the radio bearer and the service data obtained after the security protection, to obtain the service data.

Optionally, in still another implementation scenario of the embodiment shown in FIG. 3 or FIG. 3a, before step 302 or step 302a, the method further includes: receiving, by the access network node, a related parameter that is of the QoS flow and that is from the mobility management device; and establishing a radio bearer for the QoS flow based on the related parameter of the QoS flow, or allocating an established radio bearer to the QoS flow based on the related parameter of the QoS flow.

The establishing a radio bearer for the QoS flow based on the related parameter of the QoS flow belongs to the prior art. Details are not described. Further, a security policy of the established radio bearer may be set as the security policy of the QoS flow.

For the allocating an established radio bearer to the QoS flow based on the related parameter of the QoS flow, a method in the prior art may be used. To be specific, whether the QoS flow can reuse a DRB is determined based on a QoS profile of the QoS flow, or whether the QoS flow can reuse a DRB may be determined based on both a QoS profile of the QoS flow and the security policy of the QoS flow.

In an example, if the related parameter that is of the QoS flow and that is received by the access network node is QFI=2, and the security policy of the QoS flow is a security policy #3, the access network node may determine, based on QFI=2, whether the QoS flow can reuse a physical resource of an established DRB. For example, if QFI=2 and QFI=1 (where a radio bearer corresponding to QFI=1 is a DRB #1) are different in terms of only priorities but are the same in terms of delays, bit error rates, and the like, the QoS flow indicated by QFI=2 can reuse the DRB #1. In other words, the DRB #1 can be allocated to the QoS flow indicated by QFI=2. In addition, if a security policy corresponding to QFI=1 is the same as a security policy corresponding to QFI=2, a security policy of the DRB #1 remains unchanged; or if a security policy corresponding to QFI=1 is different from a security policy corresponding to QFI=2, a security policy of the DRB #1 is modified based on the security policy corresponding to QFI=2.

Further, if a network side or the terminal initiates a service corresponding to QFI=1 again, the security policy of the DRB #1 may be modified again to the security policy corresponding to QFI=1. This is not limited.

In another example, an established radio bearer is allocated to the QoS flow based on the related parameter of the QoS flow and the security policy of the QoS flow. For example, if the related parameter that is of the QoS flow and that is received by the access network node is QFI=2, and the security policy of the QoS flow is a security policy #3, the access network node may determine, based on QFI=2 and the security policy #3, whether the QoS flow can reuse a physical resource of a DRB. If QFI=2 and QFI=1 (where a radio bearer corresponding to QFI=1 is a DRB #1) are different in terms of only priorities, but are the same in terms of delays, bit error rates, and the like, and correspond to a same security policy, the QoS flow indicated by QFI=2 can reuse the DRB #1. In other words, the DRB #1 is allocated to the QoS flow indicated by QFI=2.

Figure 4:
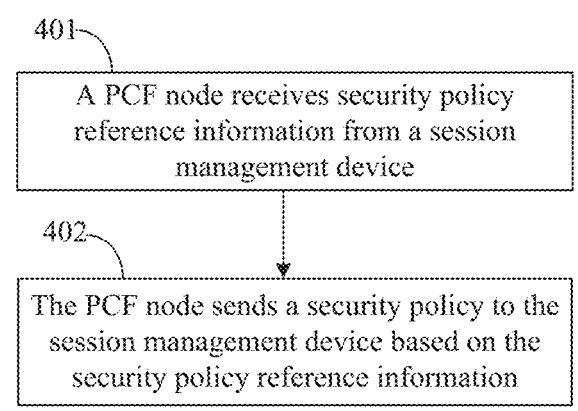
FIG. 4 is a flowchart of another communication method according to an embodiment of this application.

As shown in FIG. 4, an embodiment of this application provides still another communication method described below.

401. A PCF node receives security policy reference information from a session management device.

The security policy reference information may include at least one of a related parameter of a QoS flow and a service-related parameter.

The related parameter of the QoS flow may include at least one of a QFI, a QCI, a 5QI, and an ARP.

The service-related parameter may include at least one of a service type and a service identifier. Specifically, the service type may be a VoIP service, an SMS, an Internet service, or the like. This is not limited. The service identifier may be an APP ID, a service destination IP address, a service port number, a special identifier that can identify a service, or the like. This is not limited.

402. The PCF node sends a security policy to the session management device based on the security policy reference information.

Specifically, step 402 may include:

obtaining, by the PCF node, the security policy based on a correspondence between a related parameter of the QoS flow and a security policy; or obtaining, by the PCF node, the security policy based on a correspondence between a service-related parameter and a security policy; or sending, by the PCF node, the security policy reference information to an application device, and receiving the security policy from the application device.

For the correspondence between a service-related parameter and a security policy and the correspondence between a related parameter of the QoS flow and a security policy, refer to the related descriptions in the embodiment shown in FIG. 2. Details are not described again.

The application device may be an AF node or a network capability exposure functional entity. This is not limited.

It should be noted that, the security policy may be used by the session management device to determine a security policy of the QoS flow. For details, refer to the related description of step 202 in the embodiment shown in FIG. 2. Details are not described again.

According to the method provided in the foregoing embodiment, the PCF node sends the security policy to the session management device based on the security policy reference information, where the security policy is used to determine the security policy of the QoS flow. In this way, different security policies can be executed for different QoS flows, to implement security protection based on a QoS flow, thereby satisfying security requirements of different services.

Figure 5:
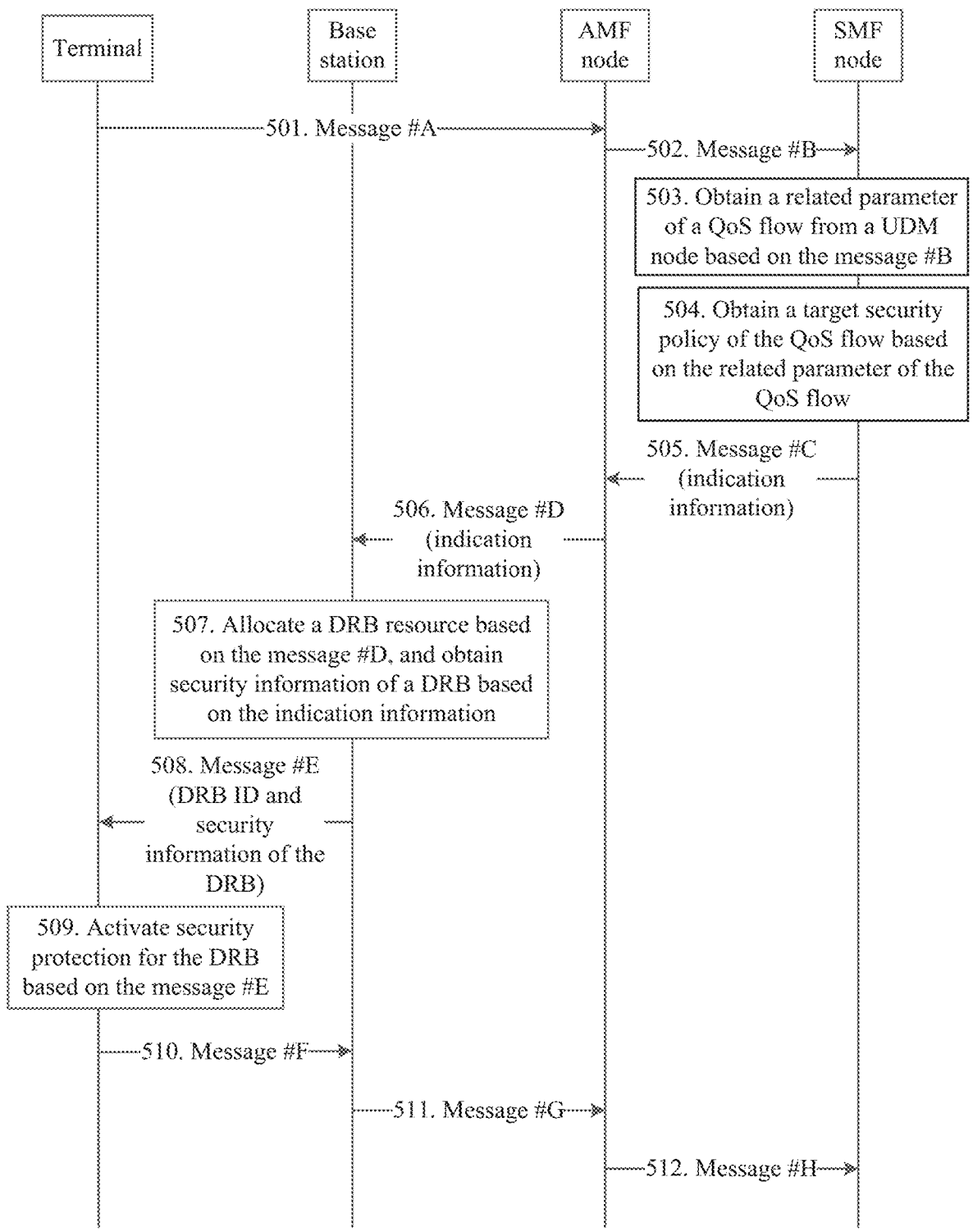
FIG. 5 is a flowchart of another communication method according to an embodiment of this application.

As shown in FIG. 5, an embodiment of this application provides still another communication method, as described below by using an example in which a session management device is an SMF node, a mobility management device is an AMF node, an access network node is a base station, and a radio bearer is a DRB.

501. A terminal sends a message #A to the AMF node.

The message #A may be a PDU session setup request. The message #A may carry a PDU session ID, may further carry a security preference of the terminal, and may further carry an identifier of the terminal.

502. The AMF node sends a message #B to the SMF node based on the message #A.

The message #B may be a PDU session setup-SM context setup request. The message #B may carry the PDU session ID, the security preference of the terminal, or the identifier of the terminal.

503. The SMF node obtains a related parameter of a QoS flow from a UDM node based on the message #B.

For example, the SMF node sends an SM data request message to the UDM node, where the message carries the identifier of the terminal. The UDM node finds subscription information of the terminal based on the identifier of the terminal, where the subscription information includes a default QoS profile. The UDM node may send the default QoS profile of the terminal to the SMF node.

The default QoS profile may include the related parameter of the QoS flow; for example, a 5QI, a QCI, or an ARP.

Optionally, the method further includes: sending, by the UDM node, a correspondence between a related parameter of the QoS flow and a security policy to the SMF node.

504. The SMF node obtains a target security policy of the QoS flow based on the related parameter of the QoS flow In an example, the SMF node stores the correspondence between a related parameter of the QoS flow and a security policy, and the SMF node may obtain the target security policy of the QoS flow based on the correspondence.

In another example, if the message #A carries the security preference of the terminal, and the SMF node stores the correspondence between a related parameter of the QoS flow and a security policy, the SMF node may obtain a first security policy of the QoS flow based on the correspondence. Then, the SMF node obtains the target security policy of the QoS flow based on the security preference of the terminal and the first security policy. For example, if the security preference has a higher priority than the first security policy, the security preference is used as the target security policy of the QoS flow.

Optionally, the SMF node may store a correspondence between a related parameter of the QoS flow and a target security policy of the QoS flow

505. The SMF node sends a message #C to the AMF node, where the message #C carries indication information.

The indication information is used to indicate the target security policy of the QoS flow. For details, refer to the related description in the embodiment shown in FIG. 2 or FIG. 3. Details are not described again.

Specifically, it is assumed that the message #C may carry an N1 message and an N2 message, or carry a related parameter of an N message and a related parameter of an N2 message, where the N message is a message transmitted through an N1 interface between the terminal and the AMF node, and the N2 message is a message transmitted through an N2 interface between the AMF node and the access network node. In an example, the N1 message may carry an identifier of a session and a QoS profile of the QoS flow, and the N2 message may carry the identifier of the session, the QoS profile of the QoS flow, and the indication information. In another example, the indication information includes first indication information and second indication information, the message #C carries the related parameter of the N1 message and the related parameter of the N2 message, the related parameter of the N1 message may include an identifier of a session, a QoS profile of the QoS flow, and the second indication information, and the related parameter of the N2 message may include the identifier of the session, the QoS profile of the QoS flow and the first indication information.

For the first indication information and the second indication information, refer to the related description in the embodiment shown in FIG. 2. Details are not described again.

Optionally, the N1 message and the N2 message in the foregoing examples may further carry the related parameter of the QoS flow.

Optionally, the message #C is a PDU session setup-session management (SM) context response message.

506. The AMF node sends a message #D to the base station based on the message #C, where the message #D carries the indication information.

The message #D may be a PDU resource setup request, and the message #D may carry the N1 message and the N2 message that are included in the message #C.

507. The base station allocates a DRB resource based on the message #D, and obtains security information of a DRB based on the indication information.

Specifically, the base station may allocate the DRB resource based on the QoS profile that is of the QoS flow and that is carried in the message #D, and the DRB is used to transmit the QoS flow. This belongs to the prior art, and details are not described.

For obtaining the security information of the DRB by the base station based on the indication information, refer to the related description in the embodiment shown in FIG. 3. Details are not described again.

Optionally, the base station stores a correspondence among a related parameter of the QoS flow, a security policy or a security algorithm of the DRB, and a DRB ID.

508. The base station sends a message #E to the terminal, where the message #E carries a DRB ID and the security information of the DRB.

The message #E may further carry the related parameter of the QoS flow. In addition, when the message #D carries the N1 message, the message #E may also carry the N1 message.

The message #E may be an RRC message, for example, a DRB setup request message, an RRC re-setup message, or an RRC reconfiguration request message.

509. The terminal activates security protection for the DRB based on the message #E.

For activating security protection for the DRB, refer to activating security protection for the radio bearer in the embodiment shown in FIG. 3. Details are not described again.

In an example, when the message #E carries the N1 message, and the N1 message carries the second indication information, step 509 may include: when a security policy that is of the DRB and that is indicated by the security information is the same as the target security policy that is of the QoS flow and that is indicated by the second indication information, activating, by the terminal, security protection for the DRB based on the security information of the DRB.

It should be noted that, when the security policy that is of the DRB and that is indicated by the security information is different from the target security policy that is of the QoS flow and that is indicated by the second indication information, the terminal may indicate, to the SMF node, that the security policy of the DRB is different from the target security policy of the QoS flow, or the terminal may break a connection to the base station. This is not limited.

In another example, the base station directly activates security protection for the DRB based on the security information that is of the DRB and that is in the message #E.

Optionally, the terminal stores a correspondence among security information, a DRB ID, and a related parameter of the QoS flow.

510. The terminal sends a message #F to the base station.

The message #F may be used to respond to the message #E. Specifically, the message #F may be an RRC message, for example, a DRB setup complete message, an RRC re-setup complete message, or an RRC reconfiguration complete message.

Optionally, the message #F carries an N1 message, and the N1 message carries the related parameter of the QoS flow and the security policy of the DRB.

511. The base station receives the message #F, and sends a message #G to the AMF node based on the message #F.

The message #G may be used to respond to the message #D, and the message #G may be a PDU session resource setup response.

Optionally, when the message #F carries the N1 message, the message #G carries the N1 message.

Optionally, when the base station does not execute the target security policy that is of the QoS flow and that is sent by the SMF node, for example, when the security policy of the DRB is different from the target security policy of the QoS flow in step 507, the message #G further carries an N2 message, where the N2 message carries a cause value, and the cause value is used to indicate a reason that the base station does not execute the target security policy that is of the QoS flow and that is sent by the SMF node, for example, congestion or overload.

512. The AMF node sends a message #H to the SMF node based on the message #G

The message #H may be an SM message.

According to the method provided in the foregoing embodiment, the SMF node sends the security policy of the QoS flow to the base station through the AMF node, and the base station sets the security information of the radio bearer based on the security policy of the QoS flow and sends the security policy of the radio bearer to the terminal. In this way, the security policy of the radio bearer can be set based on the security policy of the QoS flow, so that different security policies can be executed for different QoS flows, to implement security protection based on a QoS flow, thereby satisfying security requirements of different services.

Optionally, in an implementation scenario of the foregoing embodiment, when the message #H carries an N1 message, and the N1 message carries the related parameter of the QoS flow and the security information of the DRB, the method further includes step 513 and step 514.

513. The SMF node compares, based on the message #H, the target security policy of the QoS flow with the security policy indicated by the security information of the DRB.

For example, the SMF node may find, based on the related parameter that is of the QoS flow and that is carried in the N1 message in the message #H, the target security policy that is of the QoS flow and that is stored by the SMF node.

For another example, the message #G and the message #H may carry the target security policy of the QoS flow.

514. When the two security policies are different, the SMF node interrupts a session of the terminal.

The session may be the PDU session mentioned in step 501.

Further, the SMF node may further report an abnormal condition to a network management system or the AMF node.

Optionally, step 514 may be replaced with the following: When the two security policies are different, if the message #H carries a cause value, the SMF node may perform corresponding processing based on the cause value. Details are as follows:

if the cause value indicates that the base station is in a congested state, and the security policy of the QoS flow cannot be satisfied based on a configuration requirement of the base station, the SMF node does not update the correspondence that is between a related parameter of the QoS flow and a security policy and that is stored by the SMF node, or the SMF node instructs another device, for example, a PCF node, a security policy network element, or the UDM node, to update the correspondence; or if the cause value indicates that a configuration rule of the base station changes, and the base station can execute only a particular security policy based on a requirement of the changed configuration rule, the SMF node updates the correspondence between a related parameter of the QoS flow and a security policy or updates a status of the base station, or the SMF node instructs another device, for example, a PCF node, a security policy network element, or the UDM node, to update the correspondence between a related parameter of the QoS flow and a security policy.

According to the method provided in the foregoing implementation scenario, when the SMF node finds that the target security policy of QoS is different from the security policy of the DRB, closed-loop processing of the problem is implemented, to avoid a potential security risk of a user that is caused when the security policy of the DRB is inconsistent with the security policy of the QoS flow for example, when the security policy of the DRB cannot satisfy a security requirement of a service carried by the QoS flow.

Optionally, in another implementation scenario of the foregoing embodiment, step 503 further includes: sending, by the UDM node, a security policy of the QoS flow to the SMF node.

In an example, the UDM node stores a correspondence between a 5QI and a security policy, and the UDM node obtains, based on the correspondence, a security policy that corresponds to a 5QI and that is in a default QoS profile of the terminal, and sends the obtained security policy to the SMF node.

In the foregoing implementation scenario, step 504 may not be performed, or step 504 may be performed.

When step 504 is not performed, the security policy that is of the QoS flow and that is sent by the UDM node to the SMF node is the target security policy of the QoS flow.

When step 504 is performed, the SMF node may determine the target security policy of the QoS flow based on the security policy that is of the QoS flow and that is received from the UDM node, for example, in combination with the security preference of the terminal. This is not limited.

It should be noted that, all messages between network-side devices (for example, between the AMF node and the SMF node, between the UDM node and the SMF node, and between the AMF node and the base station) in the embodiments of this application may be replaced in a servitization manner. To be specific, a recipient of a message obtains, from a sender of the message through a servitization interface, information carried in the message, to replace a conventional manner of transmitting information by using a message.

Figure 6:
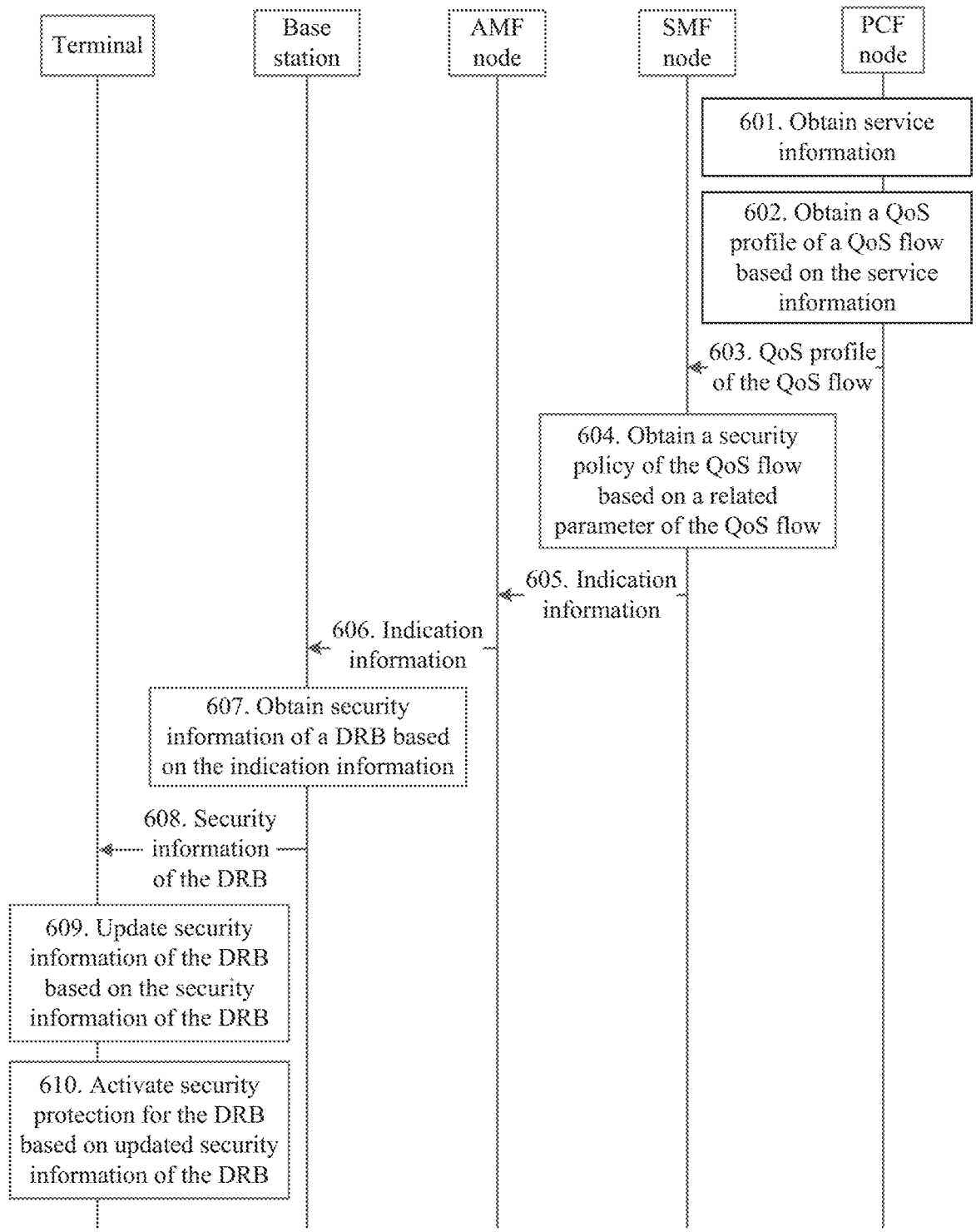
FIG. 6 is a flowchart of another communication method according to an embodiment of this application.

As shown in FIG. 6, an embodiment of this application provides still another communication method, as described below by using an example in which a session management device is an SMF node, a mobility management device is an AMF node, an access network node is a base station, and a radio bearer is a DRB.

601. A PCF node obtains service information.

The service information may be used to identify a service. For example, the service information includes an APP ID, an Ethernet address, a 5-tuple, or location-based service information. Specifically, the location-based service information may mean that information at a preset location of a data packet is used to identify a service. For example, when information about a second byte in a header of the data packet is set to binary 10000000, it indicates that the service is WeChat.

In an example, the service information may be obtained from the SMF node, for example, obtained from the SMF node in a servitization manner, or may be sent by the SMF node to the PCF node by using a PDU session modification request message. Specifically, the service information may be sent by a terminal to the SMF node through the base station and the AMF node.

In another example, the service information may be obtained from an application server. Similar to the foregoing example, the service information may be delivered in a servitization manner or in a manner of sending a message. This is not limited.

602. The PCF node obtains a QoS profile of a QoS flow based on the service information.

For example, the QoS profile of the QoS flow is determined based on subscription information related to the service, and the like. This belongs to the prior art, and details are not described.

603. The SMF node obtains the QoS profile of the QoS flow from the PCF node.

Optionally, step 603 further includes: allocating, by the SMF node, a QFI to the QoS profile.

Optionally, step 603 further includes: obtaining, by the SMF node, a security policy of the QoS flow from the PCF node.

The obtaining in step 603 may be in a message delivery manner or a servitization manner. This is not limited.

604. The SMF node obtains the security policy of the QoS flow based on a related parameter of the QoS flow.

The related parameter of the QoS flow, for example, a QCI, a 5QI, or an ARP, may be included in the QoS profile in step 603, or the related parameter of the QoS flow may be the QFI allocated in step 603. This is not limited.

Apparently, when step 603 further includes the obtaining, by the SMF node, a security policy of the QoS flow from the PCF node, step 604 may be omitted.

For the security policy of the QoS flow, refer to the target security policy in the embodiment shown in FIG. 2. For step 604, refer to the implementation of obtaining the target security policy in the embodiment shown in FIG. 2. Details are not described again.

605. The AMF node obtains indication information from the SMF node.

The indication information is used to indicate the security policy of the QoS flow.

606. The base station obtains the indication information from the AMF node.

The obtaining in step 605 and step 606 may be in a message delivery manner or a servitization manner. This is not limited.

607. The base station obtains security information of a DRB based on the indication information.

For details about step 607, refer to the related description in the embodiment shown in FIG. 3. Details are not described again.

The DRB may be an established DRB or a newly established DRB. For details, refer to the related description about allocating an established radio bearer in the embodiment shown in FIG. 3. Details are not described again.

608. The base station sends the security information of the DRB to a terminal.

609. The terminal updates security information of the DRB based on the security information of the DRB.

Optionally, step 608 further includes: sending, by the base station, the indication information to the terminal.

Further, step 609 may be replaced with step 609a.

609a. When a security policy indicated by the security information of the DRB is the same as a security policy indicated by the indication information, the terminal updates security information of the DRB based on the security information of the DRB.

610. The terminal activates security protection for the DRB based on updated security information of the DRB.

It should be noted that for descriptions of terms, steps, and the like in this embodiment, refer to the related description in the embodiment shown in FIG. 2 or FIG. 3. Details are not described again.

According to the method provided in the foregoing implementation scenario, the SMF node can dynamically update the security policy of the QoS flow, so that the base station dynamically adjusts the security policy of the DRB based on an updated security policy of the QoS flow; to dynamically adjust security protection for the QoS flow.

Figure 7:
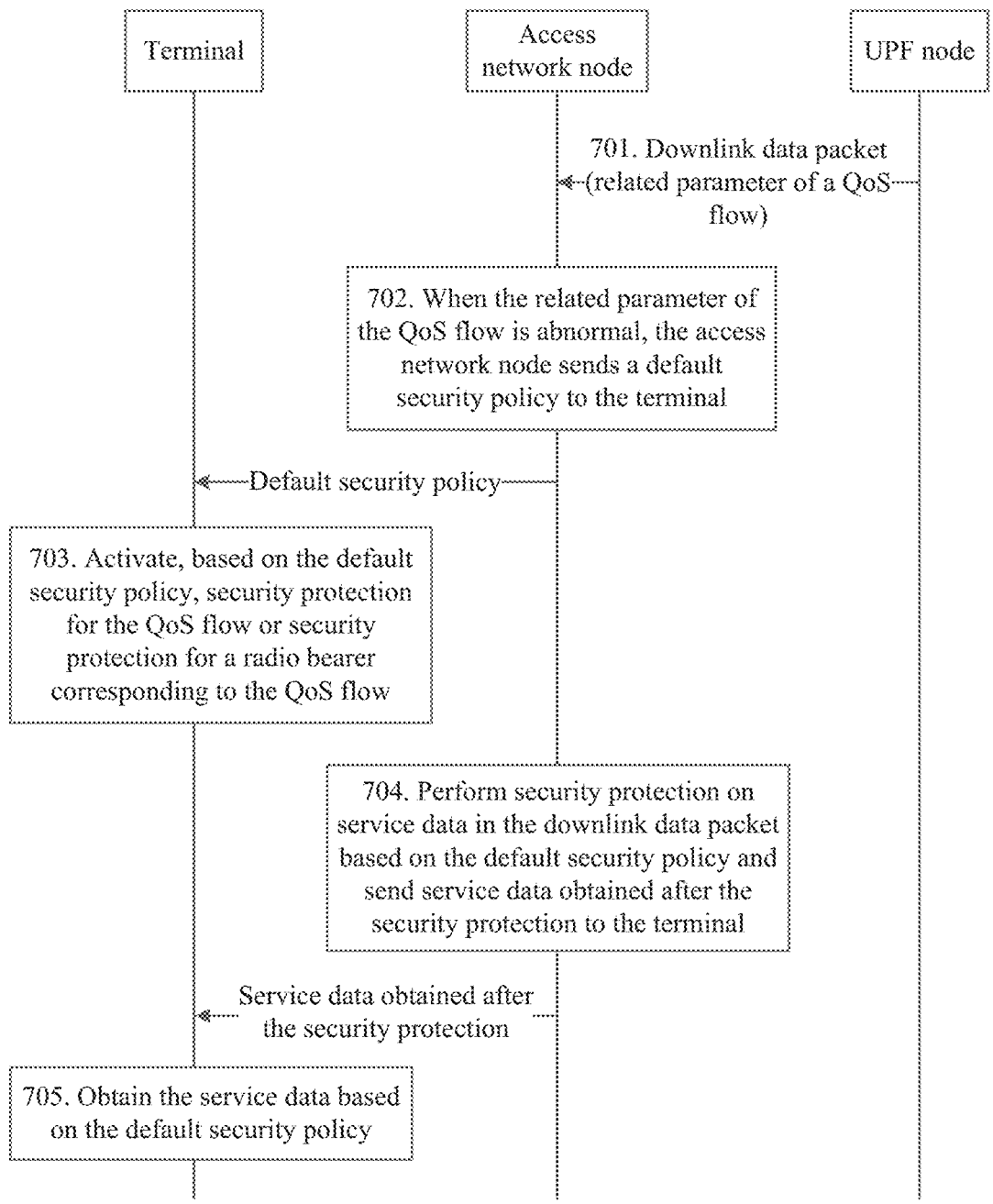
FIG. 7 is a flowchart of still another communication method according to an embodiment of this application.

As shown in FIG. 7, an embodiment of this application provides still another communication method described below.

701. An access network node receives a downlink data packet from a UPF node, where the downlink data packet carries a related parameter of a QoS flow.

702. When the related parameter of the QoS flow is abnormal, the access network node sends a default security policy to a terminal.

That the related parameter of the QoS flow is abnormal may mean that the related parameter of the QoS flow is not within a value range that is of a related parameter of a QoS flow and that is defined in the 3GPP standard. For example, the 3GPP standard defines various QFI values. If a QFI carried in the downlink data packet does not belong to the QFI values defined in the standard, the QFI carried in the downlink data packet is abnormal.

The default security policy may be a security policy pre-stored in the access network node, or may be dynamically configured by a core network for the access network node. This is not limited.

Accordingly, the terminal receives the default security policy of the QoS flow.

703. The terminal activates, based on the default security policy, security protection for the QoS flow or security protection for a radio bearer corresponding to the QoS flow.

Optionally, the method further includes the following steps:

704. A base station performs security protection on service data in the downlink data packet based on the default security policy, and sends service data obtained after the security protection to the terminal.

705. The terminal receives the service data obtained after the security protection, and obtains the service data based on the default security policy.

According to the method provided in the foregoing implementation, when the related parameter that is of the QoS flow and that is in the downlink data packet is abnormal, the access network node performs security protection on the service data in the downlink data packet by using the default security policy, thereby enhancing an error tolerance capability of a network and ensuring security of the network.

Figure 7A:
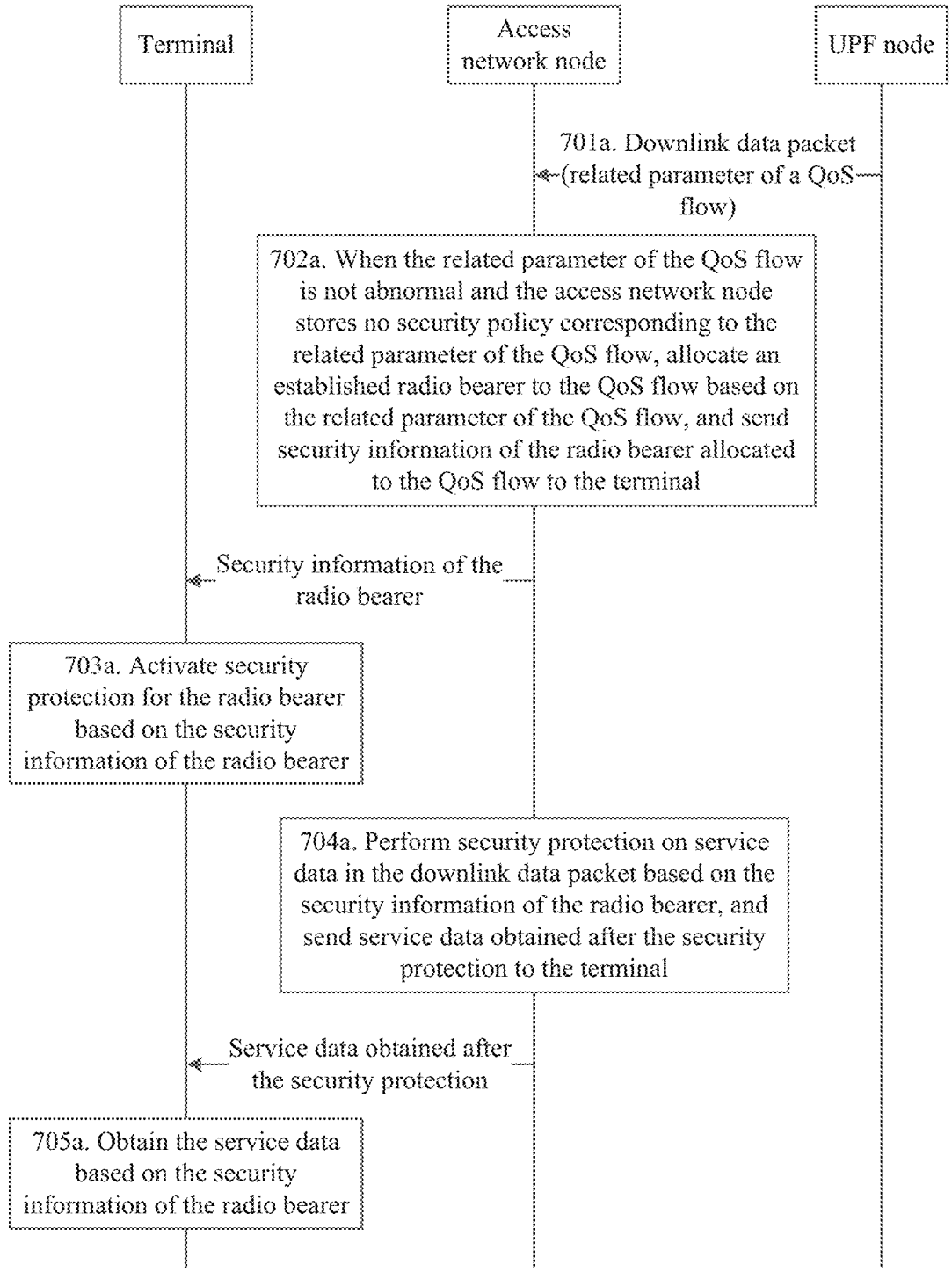
FIG. 7a is a flowchart of still another communication method according to an embodiment of this application.

As shown in FIG. 7a, an embodiment of this application provides still another communication method described below.

701a. An access network node receives a downlink data packet from a UPF node, where the downlink data packet carries a related parameter of a QoS flow.

702a. When the related parameter of the QoS flow is not abnormal and the access network node stores no security policy corresponding to the related parameter of the QoS flow; the access network node allocates an established radio bearer to the QoS flow based on the related parameter of the QoS flow, and sends security information of the radio bearer allocated to the QoS flow to a terminal.

That the related parameter of the QoS flow is not abnormal may mean that the related parameter is within a value range defined in the 3GPP standard. This is similar to the description of the anomaly in step 702. Details are not described again.

In addition, for allocating the established radio bearer, refer to the related description in the embodiment shown in FIG. 3. Details are not described again.

It should be noted that, one session may be used to carry a plurality of QoS flows, and the related parameter of the QoS flow may be that of a QoS flow of a particular session. For example, if the access network node records or finds, in stored information about the QoS flow of the session, no security policy corresponding to the related parameter of the QoS flow, or the access network node receives no indication information, where the indication information is used to indicate the security policy of the QoS flow, it may indicate that the access network node stores no security policy corresponding to the related parameter of the QoS flow: This is not limited.

703a. The terminal activates security protection for the radio bearer based on the security information of the radio bearer.

Optionally, the method further includes the following steps:

704a. A base station performs security protection on service data in the downlink data packet based on the security information of the radio bearer, and sends service data obtained after the security protection to the terminal.

705a. The terminal receives the service data obtained after the security protection, and obtains the service data based on the security information of the radio bearer.

According to the method provided in the foregoing implementation, when the related parameter of the QoS flow in the downlink data packet is not abnormal, and the access network node stores no security policy corresponding to the related parameter of the QoS flow, the access network node performs security protection on the service data in the downlink data packet by using a security policy of a radio bearer reused by the QoS flow, thereby ensuring security of a network and reducing complexity.

Figure 7B:
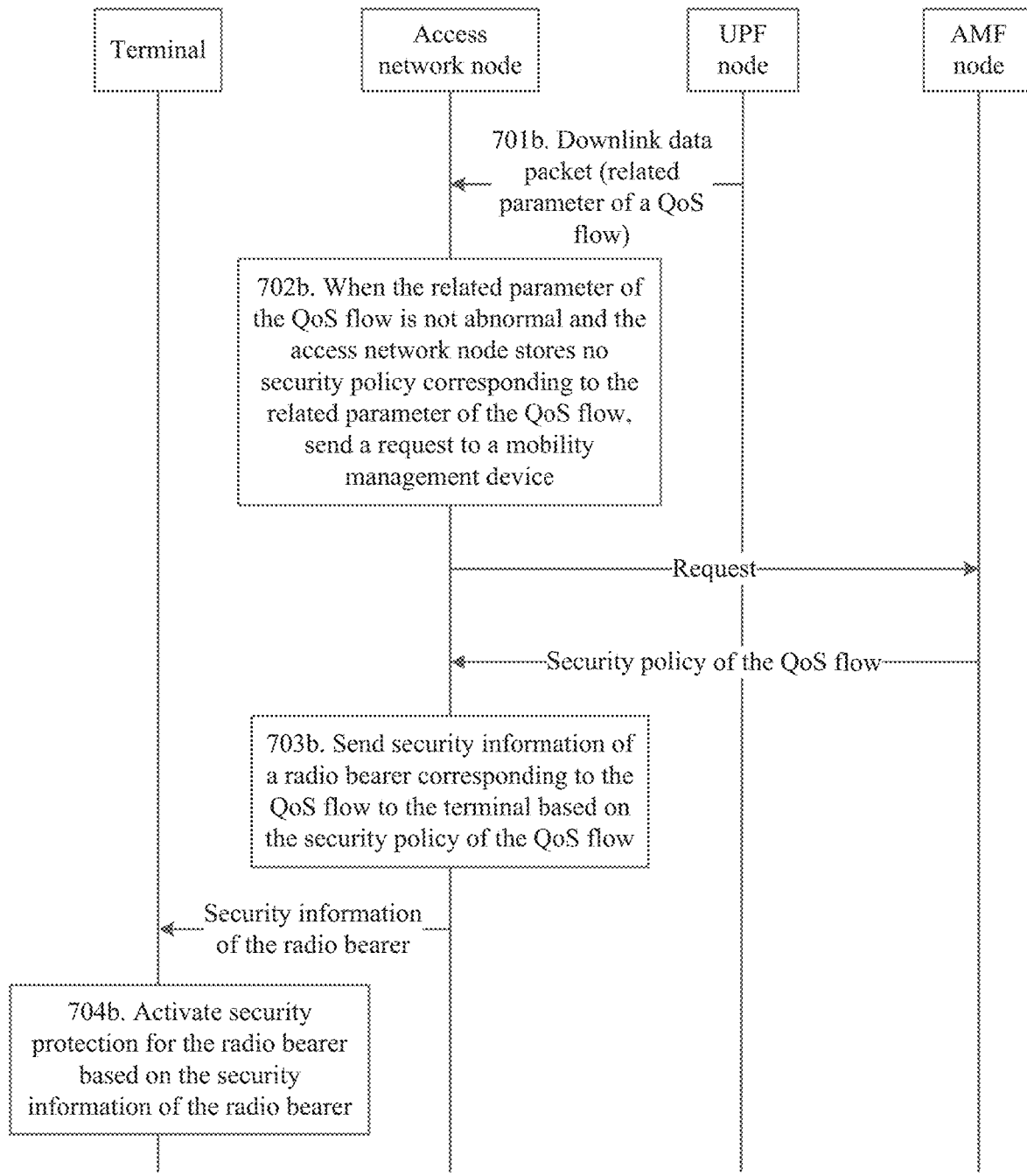
FIG. 7b is a flowchart of still another communication method according to an embodiment of this application.

As shown in FIG. 7b, an embodiment of this application provides still another communication method described below.

701b. An access network node receives a downlink data packet from a UPF node, where the downlink data packet carries a related parameter of a QoS flow.

702b. When the related parameter of the QoS flow is not abnormal and the access network node stores no security policy corresponding to the related parameter of the QoS flow, the access network node sends a request to a mobility management device, where the request is used to obtain a security policy of the QoS flow.

For details about that the access network node stores no security policy corresponding to the related parameter of the QoS flow, an anomaly, and the like, refer to the related descriptions in FIG. 7 or FIG. 7a. Details are not described again.

Specifically, the access network node may send a cause value to the mobility management device, where the cause value is used to indicate that the access network node stores no security policy of the QoS flow the access network node cannot learn of the security policy of the QoS flow, or the related parameter of the QoS flow is a parameter not configured for the access network node. This is not limited.

For example, after receiving a request #1 sent by the access network node, the mobility management device may send a request #2 to a session management device, where the request #2 is used to obtain the security policy of the QoS flow. Correspondingly, the session management device may send the security policy of the QoS flow to the access network node through the mobility management device by using the method provided in the embodiment shown in FIG. 2.

The request #1 and the request #2 may be the same or different. Both the request #1 and the request #2 may be implemented in a message form or may be implemented in a servitization form. This is not limited.

703b. The access network node receives the security policy of the QoS flow from the mobility management device, and sends security information of a radio bearer corresponding to the QoS flow to a terminal based on the security policy of the QoS flow.

704b. The terminal activates security protection for the radio bearer based on the security information of the radio bearer.

Optionally, the method further includes step 704a and step 705a. Details are not described again.

According to the method provided in the foregoing implementation, when the related parameter of the QoS flow in the downlink data packet is not abnormal, and the access network node stores no security policy corresponding to the related parameter of the QoS flow, the access network node requests the mobility management device to provide the security policy of the QoS flow, so as to obtain the security information of the radio bearer based on the security policy of the QoS flow and perform security protection on service data in the downlink data packet based on the security information of the radio bearer, thereby satisfying a security requirement of a service.

Figure 7C:
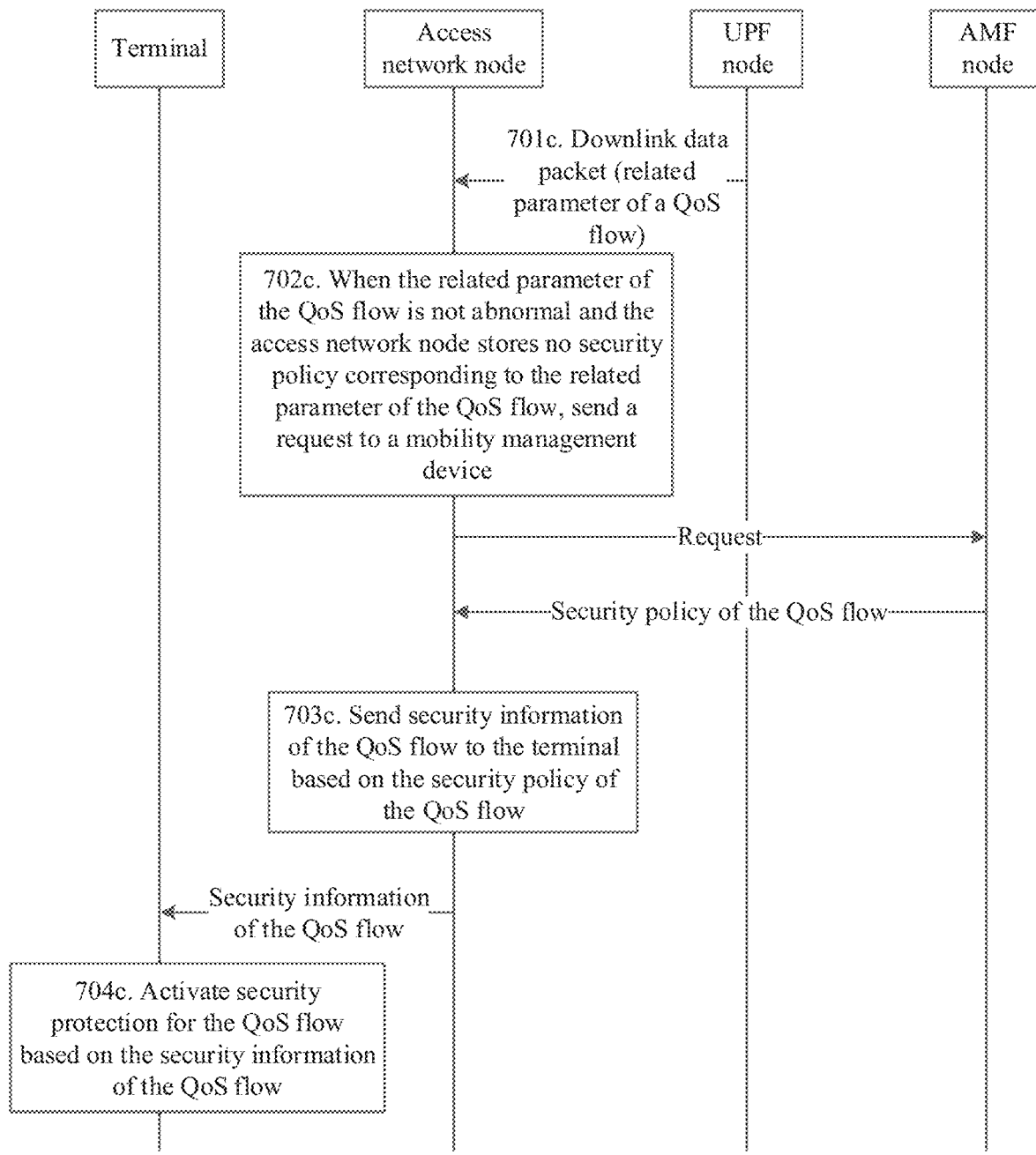
FIG. 7c is a flowchart of still another communication method according to an embodiment of this application.

As shown in FIG. 7c, an embodiment of this application provides still another communication method described below.

701c. An access network node receives a downlink data packet from a UPF node, where the downlink data packet carries a related parameter of a QoS flow.

702c. When the related parameter of the QoS flow is not abnormal and the access network node stores no security policy corresponding to the related parameter of the QoS flow, the access network node sends a request to a mobility management device, where the request is used to obtain a security policy of the QoS flow.

For step 702c, refer to step 702b. Details are not described again.

703c. The access network node sends security information of the QoS flow to a terminal based on the security policy of the QoS flow.

The security information is used to indicate a security policy of the QoS flow, where the security policy may be the same as or different from the received security policy. For example, the access network node may determine the security information of the QoS flow based on a status of the access network node and the received security policy. In addition, the security information may be a security policy or a security algorithm. This is not limited.

704c. The terminal activates security protection for the QoS flow based on the received security information of the QoS flow.

Activating security protection for the QoS flow may indicate that security policies of different QoS flows on a same radio bearer may be different or the same. For details, refer to a related description in the embodiment shown in FIG. 8. Details are not described again.

Optionally, the method further includes the following steps:

705c. A base station performs security protection on service data in the downlink data packet based on the security information of the QoS flow, and sends service data obtained after the security protection to the terminal.

706c. The terminal receives the service data obtained after the security protection, and obtains the service data based on the security information of the QoS flow.

According to the method provided in the foregoing implementation, when the related parameter of the QoS flow in the downlink data packet is not abnormal, and the access network node stores no security policy corresponding to the related parameter of the QoS flow, the access network node requests the mobility management device to provide the security policy of the QoS flow, so as to implement security protection on the service data in the downlink data packet based on the security policy of the QoS flow, thereby satisfying security requirements of different services.

Figure 7D:
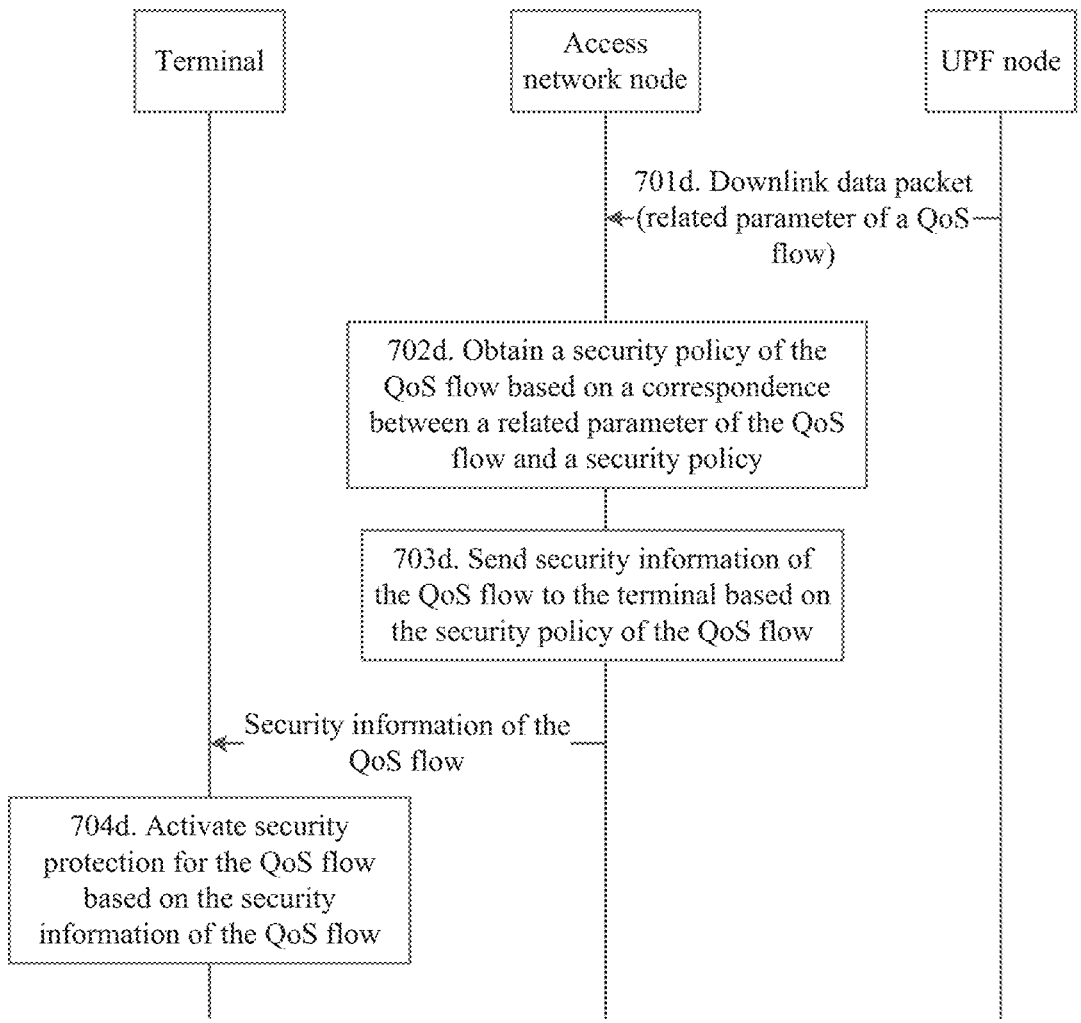
FIG. 7d is a flowchart of still another communication method according to an embodiment of this application.

As shown in FIG. 7d, an embodiment of this application provides still another communication method described below.

701d. An access network node receives a downlink data packet from a UPF node, where the downlink data packet carries a related parameter of a QoS flow.

702d. The access network node obtains a security policy of the QoS flow based on a correspondence between a related parameter of the QoS flow and a security policy.

The correspondence between a related parameter of the QoS flow and a security policy may be configured by a core network device, or may be pre-stored in the access network node, for example, pre-stored based on indication information of a core network device. For details, refer to the method provided in the embodiment shown in FIG. 3 or FIG. 8. This is not limited.

703d. The access network node sends security information of the QoS flow to a terminal based on the security policy of the QoS flow.

When the security information is a security algorithm, the security information of the QoS flow may be obtained based on the security policy of the QoS flow. Specifically, a method in the prior art may be used, and details are not described.

704d. The terminal activates security protection for the QoS flow based on the security information of the QoS flow.

Optionally, the method further includes step 705c and step 706c. For details, refer to the embodiment shown in FIG. 7c. Details are not described again.

According to the method provided in the foregoing implementation, the access network node performs security protection on service data in the downlink data packet based on the security policy of the QoS flow, thereby satisfying security requirements of different services.

Figure 7E:
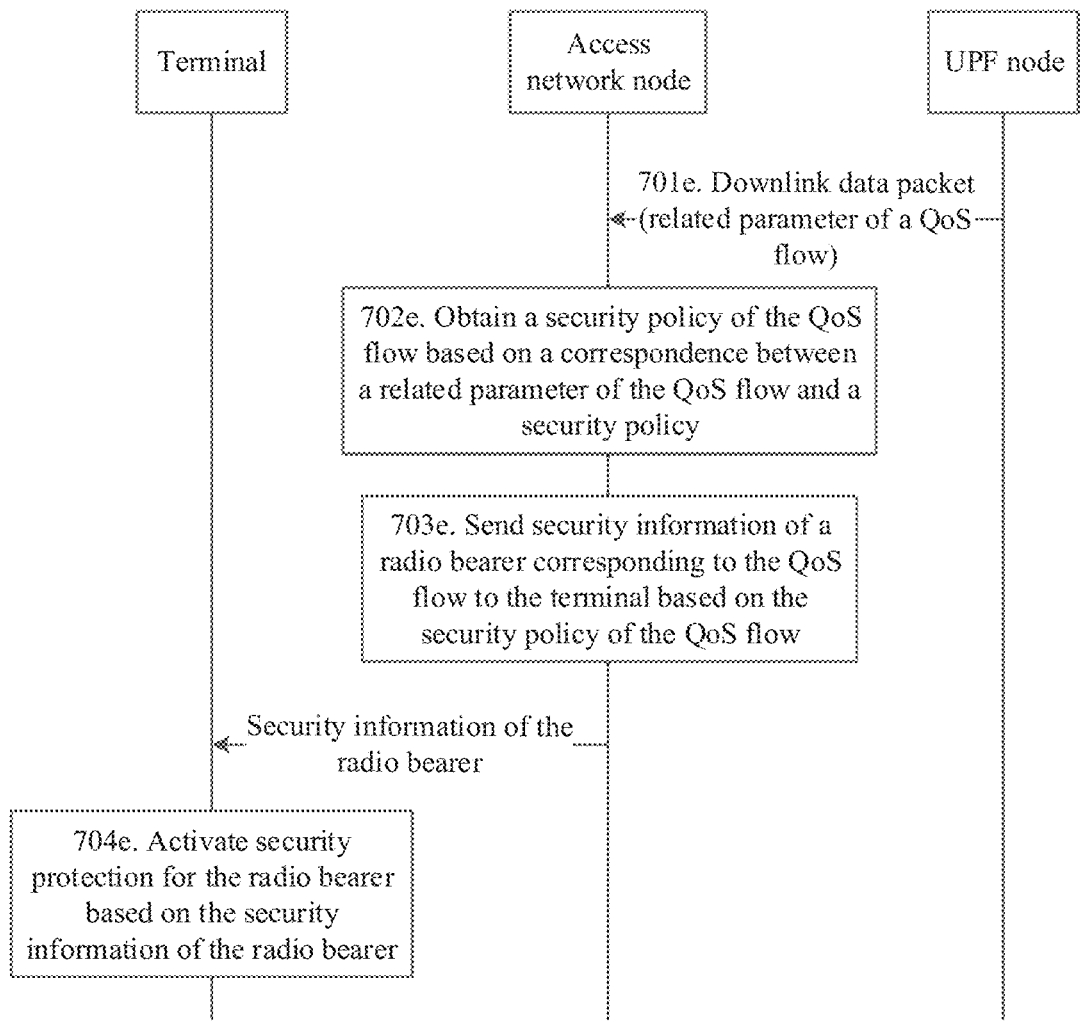
FIG. 7e is a flowchart of still another communication method according to an embodiment of this application.

As shown in FIG. 7e, an embodiment of this application provides still another communication method described below.

701e. An access network node receives a downlink data packet from a UPF node, where the downlink data packet carries a related parameter of a QoS flow.

702e. The access network node obtains a security policy of the QoS flow based on a correspondence between a related parameter of the QoS flow and a security policy.

703e. The access network node sends security information of a radio bearer corresponding to the QoS flow to a terminal based on the security policy of the QoS flow.

704e. The terminal activates security protection for the radio bearer based on the security information of the radio bearer.

Optionally, the method further includes step 704a and step 705a. Details are not described again.

According to the method provided in the foregoing implementation, the access network node obtains the security information of the radio bearer based on the security policy of the QoS flow and performs security protection on service data in the downlink data packet based on the security information of the radio bearer, thereby satisfying a security requirement of a service.

Figure 7F:
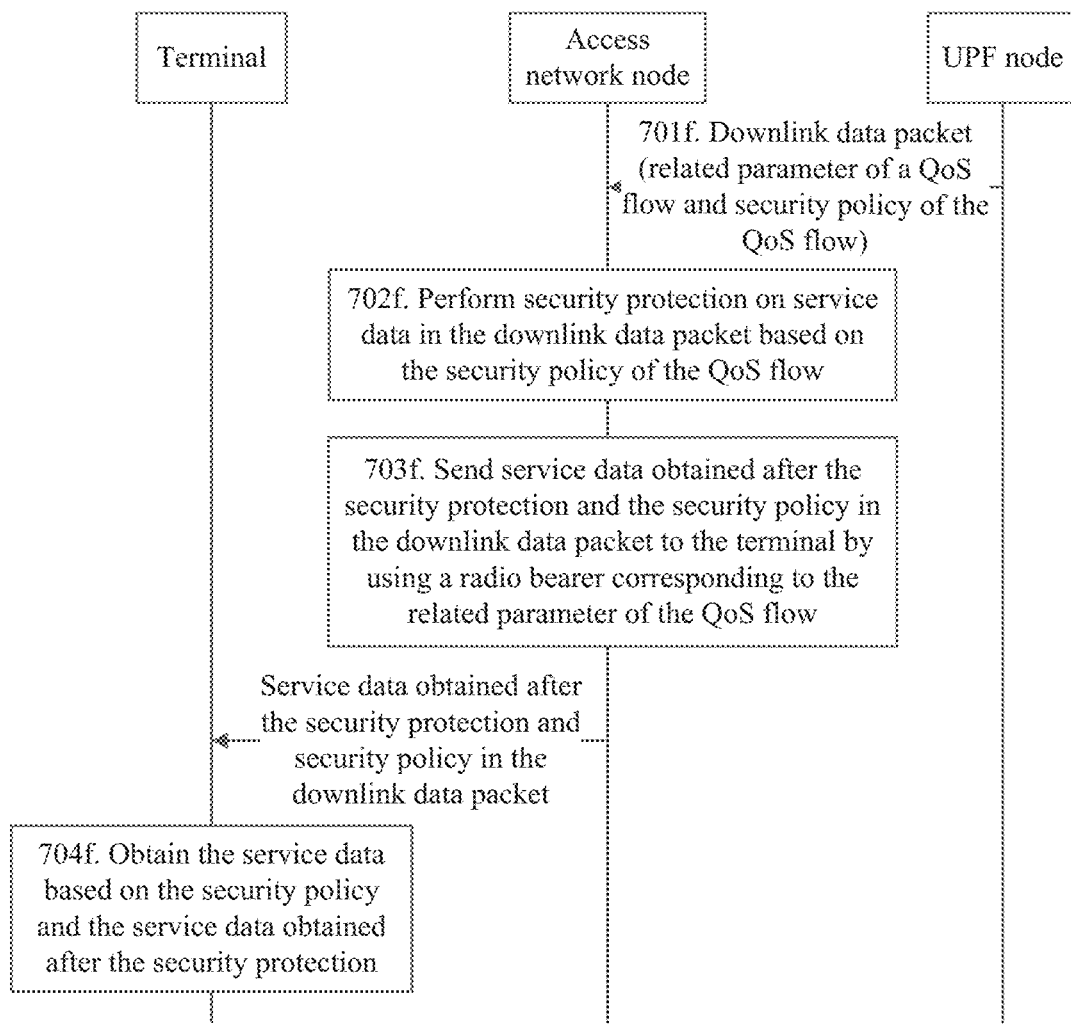
FIG. 7f is a flowchart of still another communication method according to an embodiment of this application.

As shown in FIG. 7f, an embodiment of this application provides still another communication method described below.

701f. An access network node receives a downlink data packet from a UPF node, where the downlink data packet carries a related parameter of a QoS flow and a security policy.

The security policy is used to indicate a security policy to be executed by the access network node on service data in the downlink data packet.

It should be noted that the security policy may be one of a security policy #0 to a security policy #3.

702f. The access network node performs security protection on the service data in the downlink data packet based on the security policy.

703f. The access network node sends service data obtained after the security protection and the security policy in the downlink data packet to a terminal by using a radio bearer corresponding to the related parameter of the QoS flow.

704f. The terminal receives, from the access network node, the security policy and the service data obtained after the security protection, and obtains the service data based on the security policy and the service data obtained after the security protection.

According to the method provided in the foregoing implementation, the access network node performs security protection on the service data in the downlink data packet based on the security policy in the downlink data packet, thereby satisfying security requirements of different services and omitting a security policy configuration process.

Figure 8:
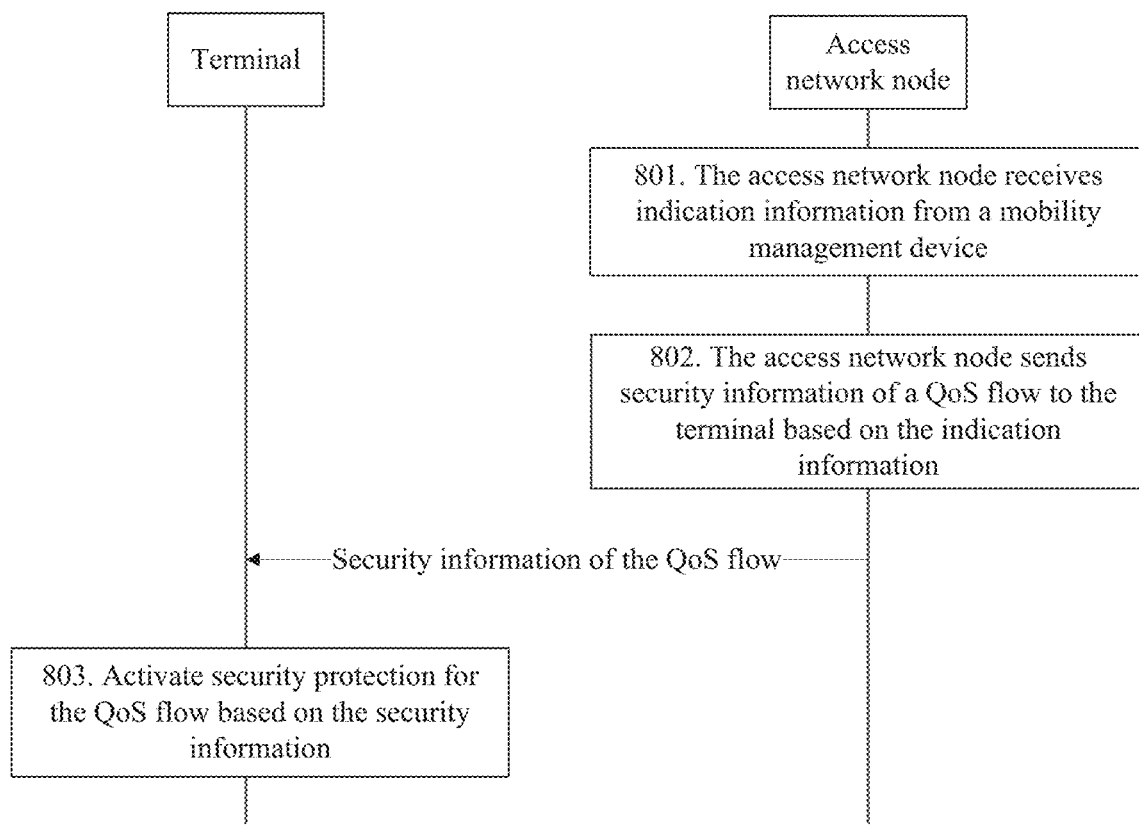
FIG. 8 is a flowchart of yet another communication method according to an embodiment of this application.

As shown in FIG. 8, an embodiment of this application provides another communication method. The method may be implemented in a PDU session setup process or a PDU session modification process. The method is specifically described below.

801: An access network node receives indication information from a mobility management device.

The indication information is used to indicate a security policy of a QoS flow. For details, refer to the related description of the indication information in the embodiment shown in FIG. 2 or FIG. 3. In addition, for the security policy, refer to the related description of the target security policy in the embodiment shown in FIG. 2. Details are not described again.

Specifically, the indication information may be used to indicate the security policy of the QoS flow to the access network node; or the indication information includes first indication information and second indication information, the first indication information is used to indicate the security policy of the QoS flow to the access network node, and the second indication information is used to indicate the security policy of the QoS flow to a terminal.

The security policy of the QoS flow may include one or more security policies, for example, a security policy #1 and a security policy #2.

802. The access network node sends security information of the QoS flow to the terminal based on the indication information.

The security information may be used to indicate a security policy of the QoS flow. For the security policy of the QoS flow, refer to the related description in the embodiment shown in FIG. 3. Details are not described again.

The security information may include a security policy or a security algorithm.

In an example, if the security information includes the security policy, the indication information and the security information may be the same. For example, when the access network node uses, as a to-be-executed security policy of the QoS flow, the security policy that is of the QoS flow and that is delivered by the mobility management device, the access network node may send the received indication information to the terminal.

In another example, if the security information includes the security policy, the indication information and the security information may be different. Specifically, the access network node may update the security policy of the QoS flow based on the indication information and a status of the access network node. In this case, the security policy included in the security information is an updated security policy. The status of the access network node may include load, a security capability, or the like of the access network node. This is not limited. For example, when the load of the access network node exceeds a preset threshold, and the security policy indicated by the indication information is enabling user plane encryption protection and enabling user plane integrity protection, the security policy that is of the QoS flow and that is obtained in step 802 is not enabling user plane encryption protection and not enabling user plane integrity protection.

Specifically, a base station may further update the security policy of the QoS flow based on the indication information. For example, the base station determines, based on the indication information and a stored security policy of the QoS flow, whether the security policy of the QoS flow changes. If the security policy of the QoS flow changes, the stored security policy of the QoS flow is replaced with the security policy indicated by the indication information or the security policy indicated by the indication information is added to the stored security policy of the QoS flow. If the security policy indicated by the indication information is a security policy #1, and the stored security policy of the QoS flow is a security policy #2, updated security policies of the QoS flow may be the security policy #1 and the security policy #2.

In still another example, if the security information includes the security algorithm, the access network node obtains the security algorithm based on the security policy indicated by the indication information, and sends the security algorithm to the terminal; or the access network node updates the security policy of the QoS flow based on the indication information and a status of the access network node, and obtains the security algorithm based on an updated security policy.

Obtaining the security algorithm based on the security policy belongs to the prior art. Details are not described.

803. The terminal receives the security information of the QoS flow from the access network node, and activates security protection for the QoS flow based on the security information.

Activating security protection for the QoS flow may include: generating a related key based on a security algorithm of the QoS flow, so as to perform security protection on data in the QoS flow.

For example, when the security information is a security algorithm, a related key may be generated based on the security algorithm; or when the security information is a security policy, a security algorithm may be obtained based on the security policy, and then a related key is generated based on the security algorithm.

Optionally, when the indication information received by the access network node includes the second indication information, the foregoing step 803 may be replaced with step 803a. Further, after step 803a, the method further includes step 804 or step 805.

803a. The terminal receives the security information of the QoS flow and second indication information from the access network node.

804. When the security policy that is of the QoS flow and that is indicated by the second indication information is the same as the security policy that is of the QoS flow and that is indicated by the security information, the terminal activates security protection for the QoS flow based on the security information.

Activating security protection for the QoS flow may include: generating a related key based on a security algorithm of the QoS flow, so as to perform security protection on service data transmitted by using the QoS flow.

805. When the security policy indicated by the second indication information is different from the security policy that is of the QoS flow and that is indicated by the security information, the terminal indicates, to a session management device, that the two security policies are different.

In an example, the terminal may send anomaly indication information to the session management device, to indicate, to the session management device, that the two security policies are different.

The anomaly indication information may include a related parameter of the QoS flow, or a related parameter of the QoS flow and the security policy indicated by the security information. This is not limited.

Optionally, when the security policy indicated by the second indication information is different from the security policy that is of the QoS flow and that is indicated by the security information, the method further includes:

activating, by the terminal, security protection for the QoS flow based on the security information of the QoS flow.

For activating security protection for the QoS flow, refer to the related description in step 804. Details are not described again.

In an example, when the security policy of the QoS flow is enabling user plane encryption protection and not enabling user plane integrity protection, the terminal activates encryption protection for the QoS flow; or when the security policy of the QoS flow is enabling user plane encryption protection and enabling user plane integrity protection, the terminal activates encryption protection and integrity protection for the QoS flow.

Alternatively, in step 805, that the terminal indicates, to a session management device, that the two security policies are different may be replaced with: The terminal breaks a connection to a base station. This is not limited.

Optionally, the method further includes step 810, and may further include step 820. For step 810, refer to step 310. For step 820, refer to the related description of step 320.

In addition, the method may further include step 830 and step 840, or step 830 and step 850. For steps 830 to 850, respectively refer to the related descriptions of steps 330 to 350. Details are not described again.

According to the method provided in the foregoing embodiment, the access network node sends the security information corresponding to the QoS flow to the terminal based on the indication information used to indicate the security policy of the QoS flow, to implement security protection based on the QoS flow. In this way, different security policies can be executed for different QoS flows, thereby satisfying security requirements of different services.

Optionally, in an implementation scenario of the foregoing embodiment, when the implementation scenario is applied to a case in which one QoS flow corresponds to one security policy, the method further includes the following steps.

806. The access network node receives a downlink data packet from a UPF node, where the down link data packet carries a related parameter of the QoS flow.

807. The access network node obtains a security policy of the QoS flow based on the related parameter of the QoS flow, and performs security protection on service data in the downlink data packet based on the security policy of the QoS flow.

Performing security protection on the service data in the downlink data packet in step 807 may be implemented by a PDCP entity in the access network node.

It should be noted that, the security policy in the embodiments of this application is not limited to being executed by the PDCP entity, and another entity, for example, an SDAP entity, having a same or similar function is also applicable. In addition, the entity may be a protocol layer or a function module of the access network node.

808. The access network node sends service data obtained after the security protection and the related parameter of the QoS flow to the terminal by using a radio bearer corresponding to the related parameter of the QoS flow.

Correspondingly, the terminal receives, from the access network node, the related parameter of the QoS flow and the service data obtained after the security protection.

809. The terminal obtains the security policy of the QoS flow based on the related parameter of the QoS flow and obtains the service data based on the security policy of the QoS flow and the service data obtained after the security protection.

It should be noted that the radio bearer corresponding to the related parameter of the QoS flow in step 808 may be newly established by the access network node for the QoS flow, or may be an established radio bearer. In other words, the QoS flow may reuse an old radio bearer. Reusing the old radio bearer may mean that different QoS flows may share one radio bearer. In addition, security policies of the different QoS flows that share the radio bearer may be the same or different. The different security policies may be executed by a same PDCP entity or different PDCP entities.

It is assumed that the related parameter of the QoS flow in step 808 is QFI=2, and the QoS flow indicated by QFI=2 and a QoS flow indicated by QFI=1 may share a DRB #1, but security policies of the two QoS flows are different. For example, QFI=1 corresponds to a security policy #1, and QFI=2 corresponds to a security policy #2.

In an example, because the security policies of the two QoS flows are different, the access network node may allocate different PDCP entities to the two QoS flows to execute different security policies. Specifically, the security policy #1 may be executed by a PDCP entity #1, and the security policy #2 may be executed by a PDCP entity #2. Further, the access network node may store a correspondence among QFI=1, an ID of the PDCP entity #1, an ID of the DRB #1, and the security policy #1, and a correspondence among QFI=2, an ID of the PDCP entity #2, the ID of the DRB #1, and the security policy #2. The access network node may identify, based on a QFI in the downlink data packet, a specific PDCP entity for performing security protection on the service data in the downlink data packet.

In another example, the security policies of the two QoS flows are different, but a same PDCP entity may be allocated to execute the different security policies. The PDCP entity may identify, based on a QFI in the downlink data packet, a specific security policy corresponding to the security protection to be performed on the service data in the downlink data packet.

Optionally, before step 808, the method further includes: receiving, by the base station, the related parameter of the QoS flow from the mobility management device; and establishing the radio bearer for the QoS flow based on the related parameter of the QoS flow, or allocating the established radio bearer to the QoS flow based on the related parameter of the QoS flow. For details, refer to the related description in the embodiment shown in FIG. 3. Details are not described again.

Optionally, in another implementation scenario of the foregoing embodiment, when the implementation scenario may be applied to a case in which security policies of one QoS flow include at least two security policies, step 802 further includes: sending, by the access network node, security policy reference information of the QoS flow to the terminal.

The reference information may be used to identify different security policies of the QoS flow, in other words, used to distinguish between different security policies included in the security policies of the QoS flow:

For example, when security policies of one QoS flow include at least two security policies, the access network node may allocate different PDCP entities to different security policies. In other words, different PDCP entities execute different security policies. The reference information may be IDs of the PDCP entities. For example, a security policy #1 corresponds to a PDCP entity #1, and a security policy #2 corresponds to a PDCP entity #2.

Apparently, the security policy reference information may alternatively be other information used to identify a security policy to be executed for the service data. This is not limited.

Further, activating the security protection of the QoS flow in the foregoing embodiment may further include: allocating, by the terminal, a PDCP entity to the security policy of the QoS flow based on the security policy of the QoS flow and the security policy reference information of the QoS flow.

Further, the method may include the following steps.

806a. The access network node receives a downlink data packet from a UPF node, where the downlink data packet carries a related parameter of the QoS flow and a security policy.

807a. The access network node performs security protection on service data in the downlink data packet based on the security policy.

808a. The access network node sends service data obtained after the security protection, the related parameter of the QoS flow, and security policy reference information in the downlink data packet to the terminal by using a radio bearer corresponding to the related parameter of the QoS flow.

The service data obtained after the security protection, the related parameter of the QoS flow, and the security policy reference information in the downlink data packet may be carried in one data packet. This is not limited.

It should be noted that, the radio bearer corresponding to the related parameter of the QoS flow in step 808a may be newly established by the access network node for the QoS flow, or may be an established radio bearer. In other words, the QoS flow may reuse an old radio bearer. Reusing the old radio bearer means that different QoS flows may share one radio bearer. In addition, security policies of the different QoS flows that share the radio bearer may be the same or different. This is not limited.

In an example, it is assumed that the related parameter of the QoS flow in step 808a is QFI=2, and the QoS flow indicated by QFI=2 and a QoS flow indicated by QFI=1 may share a DRB #1, but security policies of the two QoS flows are different. For example, QFI=1 corresponds to a security policy #1, and QFI=2 corresponds to a security policy #2 and the security policy #1, where the security policy #1 corresponding to QFI=2 and the security policy corresponding to QFI=1 may be executed by one PDCP entity, and the security policy #2 corresponding to QFI=2 may be executed by another PDCP entity. Specifically, the security policy #1 may be executed by a PDCP entity #1, and the security policy #2 may be executed by a PDCP entity #2. Further, the access network node may store a correspondence among QFI=1, an ID of the PDCP entity #1, an ID of the DRB #1, and the security policy #1, a correspondence among QFI=2, an ID of the PDCP entity #2, the ID of the DRB #1, and the security policy #1, and a correspondence among QFI=2, the ID of the PDCP entity #2, the ID of the DRB #1, and the security policy #2.

In another example, if the related parameter of the QoS flow in step 808*a* is QFI=2, and QFI=2 corresponds to a security policy #1 and a security policy #2, the access network node establishes a DRB #2 for the QoS flow indicated by QFI=2, and allocates two different PDCP entities to respectively execute the security policy #1 and the security policy #2.

Optionally, before step 808*a*, the method further includes: receiving, by the base station, the related parameter of the QoS flow from the mobility management device; and establishing the radio bearer for the QoS flow based on the related parameter of the QoS flow, or allocating the established radio bearer to the QoS flow based on the related parameter of the QoS flow. For details, refer to the related description in the embodiment shown in FIG. 3. Details are not described again.

809*a*. The terminal receives, from the access network node, the related parameter of the QoS flow, the security policy reference information, and the service data obtained after the security protection, obtains the security policy in the downlink data packet based on the related parameter of the QoS flow and the security policy reference information, and then obtains the service data based on the obtained security policy and the service data obtained after the security protection.

For example, if the security protection in step 807*a* is encryption protection, the related parameter of the QoS flow in the downlink data packet is QFI=1, the security policy corresponding to QFI=1 is the security policy #1, and the security policy #1 corresponds to the PDCP entity #1, the terminal may learn, based on the received QFI=1 and the ID of the PDCP entity #1, of a security policy of the service data obtained after the security protection, and then perform, based on the learned security policy, protection removal (for example, decryption) on the service data obtained after the security protection, to obtain the service data.

Optionally, in another implementation scenario of the foregoing embodiment, when the implementation scenario may be applied to a case in which security policies of one QoS flow include at least two security policies, the method further includes the following steps.

806*b*. The access network node receives a downlink data packet from a UPF node, where the downlink data packet carries a related parameter of the QoS flow and a security policy.

The security policy is used to indicate a security policy to be executed by the access network node on service data in the downlink data packet.

807*b*. The access network node performs security protection on the service data in the downlink data packet based on the security policy.

808*b*. The access network node sends service data obtained after the security protection and security policy reference information to the terminal by using a radio bearer corresponding to the related parameter of the QoS flow.

The security policy reference information may be used to indicate the security policy in the downlink data packet, for example, may be a PDCP ID, or may be the security policy in the downlink data packet.

The security policy reference information and the service data obtained after the security protection may be carried in a same data packet. This is not limited.

809*b*. The terminal receives, from the access network node, the security policy and the service data obtained after the security protection, and obtains the service data based on the security policy and the service data obtained after the security protection.

Figure 9:
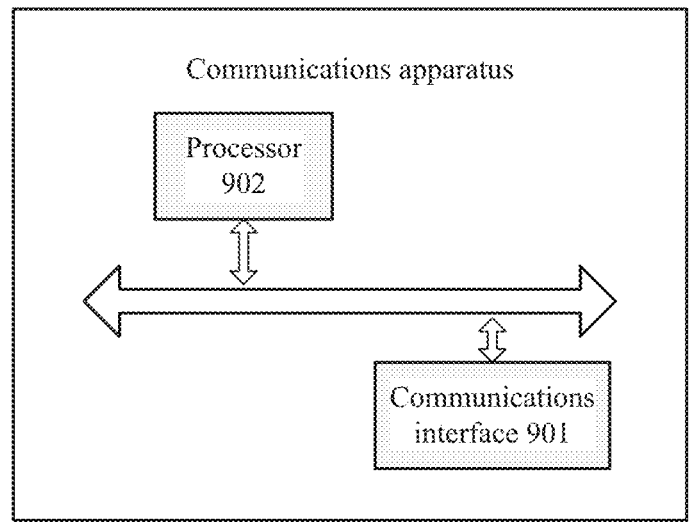
FIG. 9 is a hardware structural diagram of a communications apparatus according to an embodiment of this application.

As shown in FIG. 9, an embodiment of this application provides a communications apparatus. The communications apparatus is configured to perform the steps performed by the session management device or the SMF node in the foregoing method embodiments. For a method, steps, and terms in this embodiment, refer to related method embodiments. Details are not described again.

Specifically, the communications apparatus may be a session management device, for example, an SMF node, or may be a system-on-a-chip or a chip. The communications apparatus includes a communications interface 901 and a processor 902. The processor 902 may include one or more processors. This is not limited.

The processor 902 is configured to receive a request through the communications interface 901, where the request is used to request to set up a session or modify a session.

The processor 902 is further configured to: obtain a target security policy of a QoS flow based on the request, and send indication information to a mobility management device through the communications interface 901, where the indication information is used to indicate the target security policy of the QoS flow.

If the communications apparatus is a session management device, the communications interface 901 may be a wired interface. For example, the interface is connected to the mobility management device, a UDM node, or a PCF node through an optical fiber. The communications interface 901 may alternatively be a wireless interface, for example, may perform communication through wifi. If the communications apparatus is a system-on-a-chip or a chip, the communications interface 901 may be an I/O interface of the chip.

Optionally, the indication information is carried in a response to the request.

Optionally, the indication information is used to indicate the target security policy of the QoS flow to an access network node; or the indication information includes first indication information and second indication information, the first indication information is used to indicate the target security policy of the QoS flow to an access network node, and the second indication information is used to indicate the target security policy of the QoS flow to a terminal.

Optionally, the processor 902 is further configured to send a related parameter of the QoS flow to the mobility management device through the communications interface 901.

The related parameter of the QoS flow may include at least one of a QFI, a QCI, a 5QI, and an ARP.

Specifically, the obtaining a target security policy of a QoS flow may include:

obtaining the target security policy based on a correspondence between a related parameter of the QoS flow and a security policy; or receiving the target security policy from a unified device management UDM node; or obtaining a first security policy based on a correspondence between a related parameter of the QoS flow and a security policy, and obtaining the target security policy based on the first security policy; or receiving, from a UDM node, a first security policy corresponding to the related parameter of the QoS flow, and obtaining the target security policy based on the first security policy; or sending the related parameter of the QoS flow to a PCF node, and receiving the target security policy from the PCF node; or when the request carries a service-related parameter of the terminal, sending the service-related parameter to a PCF node, and receiving the target security policy from the PCF node.

Further, the obtaining the target security policy based on the first security policy may include:

determining the target security policy based on a security preference of the terminal and the first security policy; or sending the first security policy and the related parameter of the QoS flow to a PCF node, and receiving the target security policy from the PCF node; or receiving, from a PCF node, a second security policy corresponding to the related parameter of the QoS flow, and determining the target security policy based on the second security policy and the first security policy.

Optionally, the processor 902 is further configured to:

send the related parameter of the QoS flow and the target security policy to a UPF node.

According to the communications apparatus provided in the foregoing embodiment, the target security policy of the QoS flow is obtained based on the received request, and the indication information used to indicate the target security policy of the QoS flow is sent to the mobility management device, where the indication information is used to set security information of an air interface. In this way, different security policies can be used for different QoS flows, to avoid a problem that only a same security policy can be used for a same terminal or a same session, thereby satisfying security requirements of different services.

Figure 10:
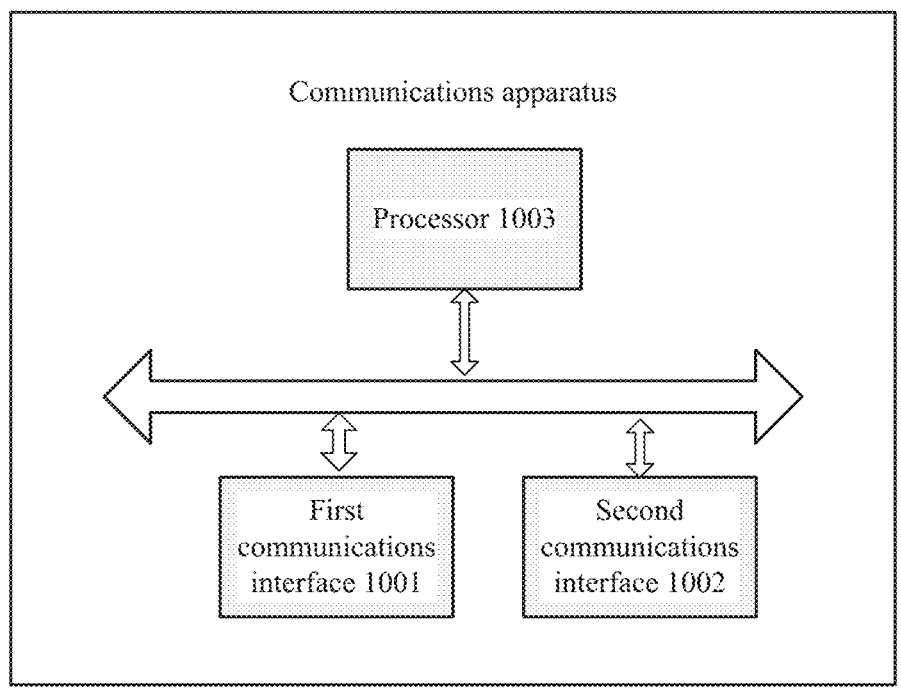
FIG. 10 is a hardware structural diagram of another communications apparatus according to an embodiment of this application.

As shown in FIG. 10, an embodiment of this application provides another communications apparatus. The communications apparatus is configured to perform the steps performed by the access network node or the base station in the foregoing method embodiments. For a method, steps, and terms in this embodiment, refer to related method embodiments. Details are not described again.

Specifically, the communications apparatus may be an access network node, or may be a system-on-a-chip or a chip. The communications apparatus includes a first communications interface 1001, a second communications interface 1002, and a processor 1003. The processor 1003 may include one or more processors. This is not limited.

The processor 1003 is configured to receive indication information from a mobility management device through the first communications interface 1001, where the indication information is used to indicate a security policy of a QoS flow.

The processor 1003 is further configured to obtain, based on the indication information, security information of a radio bearer corresponding to the QoS flow, where the security information is used to indicate a security policy of the radio bearer.

The processor 1003 is further configured to send an identifier of the radio bearer and the security information of the radio bearer to a terminal through the second communications interface 1002.

The first communications interface 1001 and the second communications interface 1002 may be a same interface, or may be different.

If the communications apparatus is a base station, the first communications interface 1001 may be a wired interface. For example, the interface is connected to the mobility management device through an optical fiber. The communications interface 1001 may alternatively be a wireless interface, for example, may communicate with the mobility management device through wifi. The second communications interface 1002 may be a transceiver, and communicate with the terminal by using a radio frequency signal. If the communications apparatus is a system-on-a-chip or a chip, the first communications interface 1001 may be an I/O interface of the chip, and the second communications interface 1002 may also be an I/O interface of the chip.

Optionally, the processor 1003 is further configured to send at least one of the following information to the terminal through the second communications interface 1002: the indication information and a related parameter of the QoS flow.

The related parameter of the QoS flow includes at least one of a QFI, a QCI, a 5QI, and an ARP.

According to the communications apparatus provided in the foregoing embodiment, the security information of the radio bearer corresponding to the QoS flow is obtained based on the indication information used to indicate the security policy of the QoS flow. In this way, the security policy of the radio bearer can be set based on the security policy of the QoS flow, to implement security protection based on the QoS flow so that different security policies can be executed for different QoS flows, thereby satisfying security requirements of different services and improving flexibility of network security.

Figure 11:
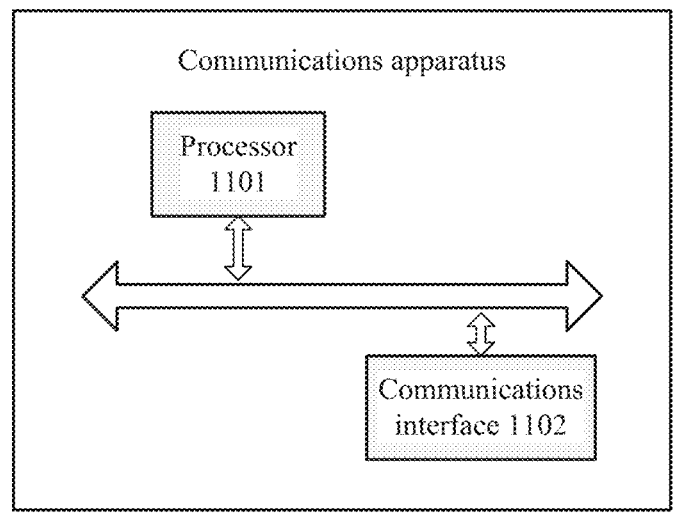
FIG. 11 is a hardware structural diagram of another communications apparatus according to an embodiment of this application.

As shown in FIG. 11, an embodiment of this application provides another communications apparatus. The communications apparatus is configured to perform the steps performed by the terminal in the foregoing method embodiments. For a method, steps, and terms in this embodiment, refer to related method embodiments. Details are not described again.

Specifically, the communications apparatus may be a terminal, or may be a system-on-a-chip or a chip. The communications apparatus includes a processor 1101 and a communications interface 1102.

The processor 1101 is configured to receive an identifier of a radio bearer, security information of the radio bearer, and indication information from an AN node through the communications interface 1102, where the security information is used to indicate a security policy of the radio bearer, and the indication information is used to indicate a security policy of a QoS flow.

The processor 1101 is further configured to: when the security policy of the radio bearer is the same as the security policy of the QoS flow activate security protection for the radio bearer based on the security information; or when the security policy of the radio bearer is different from the security policy of the QoS flow, indicate, to a session management device through the communications interface 1102, that the security policy of the radio bearer is different from the security policy of the QoS flow.

If the communications apparatus is a terminal, the communications interface 1102 may be a transceiver, and the transceiver may include a radio frequency function. If the communications apparatus is a system-on-a-chip or a chip, the communications interface 1102 may be an I/O interface of the chip.

Optionally, the indicating, to a session management device, that the security policy of the radio bearer is different from the security policy of the QoS flow includes:

sending anomaly indication information to the session management device, where the anomaly indication information is used to indicate that the security policy of the radio bearer is different from the security policy of the QoS flow.

Optionally, when the security policy of the radio bearer is different from the security policy of the QoS flow, the processor 1101 is further configured to activate security protection for the radio bearer based on the security information of the radio bearer.

Optionally, the processor 1101 is further configured to: obtain a security preference of a terminal; and send the security preference of the terminal to the session management device through the communications interface 1102.

Optionally, the processor 1101 is further configured to obtain the security preference of the terminal based on security preference reference information of the terminal.

The security preference reference information includes at least one of the following: an APN of the terminal, service-related information of the terminal, a quality of service requirement of the terminal, a network status of the terminal, subscription information of the terminal, and a status of the terminal.

According to the communications apparatus provided in the foregoing embodiment, the received security policy of the radio bearer is compared with the security policy of the QoS flow. When the security policy of the radio bearer is the same as the security policy of the QoS flow, the terminal activates security protection for the radio bearer. Because the security policy of the radio bearer is set based on the security policy of the QoS flow, different security policies can be executed for different QoS flows, to implement security protection based on a QoS flow, thereby satisfying security requirements of different services. Alternatively, when the security policy of the radio bearer is different from the security policy of the QoS flow, the terminal indicates, to the session management device, that the two security policies are different, thereby ensuring that a core network, an access network, and the terminal use a same security policy for a same QoS flow.

Figure 12:
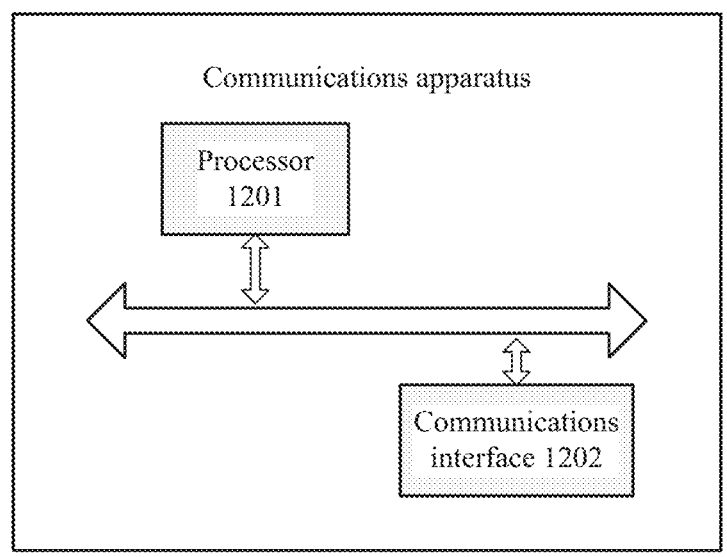
FIG. 12 is a hardware structural diagram of still another communications apparatus according to an embodiment of this application.

As shown in FIG. 12, an embodiment of this application provides another communications apparatus. The communications apparatus is configured to perform the steps performed by the PCF node in the foregoing method embodiments. For a method, steps, and terms in this embodiment, refer to related method embodiments. Details are not described again.

Specifically, the communications apparatus may be a PCF node, or may be a system-on-a-chip or a chip. The communications apparatus includes a processor 1201 and a communications interface 1202.

The processor 1201 is configured to receive security policy reference information from a session management device through the communications interface 1202, where the security policy reference information includes at least one of a related parameter of a QoS flow and a service-related parameter.

The processor 1201 is further configured to send a security policy to the session management device based on the security policy reference information.

If the communications apparatus is a PCF node, the communications interface 1202 may be a wired interface. For example, the interface is connected to the session management device or a UDM node through an optical fiber. The communications interface 1202 may alternatively be a wireless interface, for example, may perform communication through wifi. If the communications apparatus is a system-on-a-chip or a chip, the communications interface 1202 may be an I/O interface of the chip.

Optionally, the sending a security policy to the session management device based on the security policy reference information includes:

obtaining the security policy based on a correspondence between a related parameter of the QoS flow and a security policy; or obtaining the security policy based on a correspondence between a service-related parameter and a security policy; or sending the security policy reference information to an application device, and receiving the security policy from the application device.

The related parameter of the QoS flow includes at least one of a QFI, a QCI, a 5QI, and an ARP; or the service-related parameter includes at least one of a service type and a service identifier.

According to the communications apparatus provided in the foregoing embodiment, the security policy is sent to the session management device based on the security policy reference information, where the security policy is used to determine a security policy of the QoS flow. In this way, different security policies can be executed for different QoS flows, to implement security protection based on a QoS flow, thereby satisfying security requirements of different services.

Figure 13:
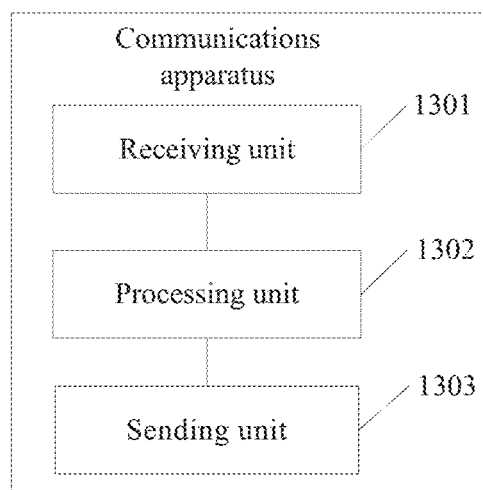
FIG. 13 is a schematic structural diagram of a communications apparatus according to an embodiment of this application.

As shown in FIG. 13, an embodiment of this application provides another communications apparatus. The communications apparatus is configured to perform the steps performed by the session management device or the SMF node in the foregoing method embodiments. For a method, steps, and terms in this embodiment, refer to related method embodiments. Details are not described again.

Specifically, the communications apparatus may be a session management device, for example, an SMF node, or may be a system-on-a-chip or a chip. The communications apparatus includes a receiving unit 1301, a processing unit 1302, and a sending unit 1303.

The receiving unit 1301 is configured to receive a request, where the request is used to request to set up a session or modify a session.

The processing unit 1302 is configured to obtain a target security policy of a QoS flow based on the request.

The sending unit 1303 is configured to send indication information to a mobility management device, where the indication information is used to indicate the target security policy of the QoS flow.

Optionally, the indication information is carried in a response to the request.

Optionally, the indication information is used to indicate the target security policy of the QoS flow to an access network node; or the indication information includes first indication information and second indication information, the first indication information is used to indicate the target security policy of the QoS flow to an access network node, and the second indication information is used to indicate the target security policy of the QoS flow to a terminal.

Optionally, the sending unit 1303 is further configured to send a related parameter of the QoS flow to the mobility management device.

The related parameter of the QoS flow may include at least one of a QFI, a QCI, a 5QI, and an ARP.

Optionally, the obtaining a target security policy of a QoS flow includes:

obtaining the target security policy based on a correspondence between a related parameter of the QoS flow and a security policy; or receiving the target security policy from a unified device management UDM node; or obtaining a first security policy based on a correspondence between a related parameter of the QoS flow and a security policy, and obtaining the target security policy based on the first security policy; or receiving, from a UDM node, a first security policy corresponding to the related parameter of the QoS flow, and obtaining the target security policy based on the first security policy; or sending the related parameter of the QoS flow to a PCF node, and receiving the target security policy from the PCF node; or when the request carries a service-related parameter of the terminal, sending the service-related parameter to a PCF node, and receiving the target security policy from the PCF node.

Optionally, the obtaining the target security policy based on the first security policy includes:

determining the target security policy based on a security preference of the terminal and the first security policy; or sending the first security policy and the related parameter of the QoS flow to a PCF node, and receiving the target security policy from the PCF node; or receiving, from a PCF node, a second security policy corresponding to the related parameter of the QoS flow; and determining the target security policy based on the second security policy and the first security policy.

Optionally, the sending unit 1303 is further configured to send the related parameter of the QoS flow and the target security policy to a UPF node.

According to the communications apparatus provided in the foregoing embodiment, the target security policy of the QoS flow is obtained based on the received request, and the indication information used to indicate the target security policy of the QoS flow is sent to the mobility management device, where the indication information is used to set security information of an air interface. In this way, different security policies can be used for different QoS flows, to avoid a problem that only a same security policy can be used for a same terminal or a same session, thereby satisfying security requirements of different services.

Figure 14:
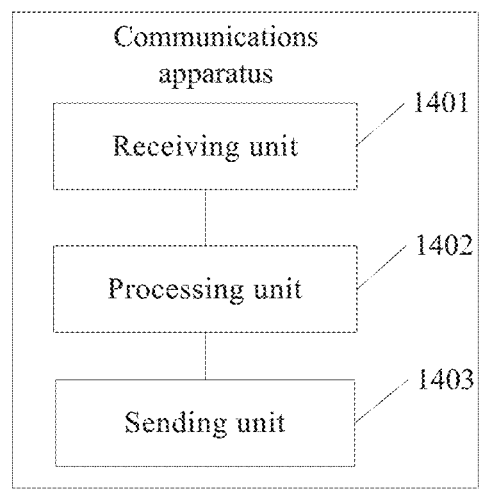
FIG. 14 is a schematic structural diagram of another communications apparatus according to an embodiment of this application.

As shown in FIG. 14, an embodiment of this application provides a communications apparatus. The communications apparatus is configured to perform the steps performed by the access network node or the base station in the foregoing method embodiments. For a method, steps, and terms in this embodiment, refer to related method embodiments. Details are not described again.

Specifically, the communications apparatus may be an access network node, or may be a system-on-a-chip or a chip. The communications apparatus includes a receiving unit 1401, a processing unit 1402, and a sending unit 1403.

The receiving unit 1401 is configured to receive indication information from a mobility management device, where the indication information is used to indicate a security policy of a quality of service QoS flow.

The processing unit 1402 is configured to obtain, based on the indication information, security information of a radio bearer corresponding to the QoS flow, where the security information is used to indicate a security policy of the radio bearer.

The sending unit 1403 is configured to send an identifier of the radio bearer and the security information of the radio bearer to a terminal.

Optionally, the sending unit 1403 is further configured to send at least one of the following information to the terminal: the indication information and a related parameter of the QoS flow.

The related parameter of the QoS flow may include at least one of a QFI, a QCI, a 5QI, and an ARP.

According to the communications apparatus provided in the foregoing embodiment, the security information of the radio bearer corresponding to the QoS flow is obtained based on the indication information used to indicate the security policy of the QoS flow. In this way, the security policy of the radio bearer can be set based on the security policy of the QoS flow, to implement security protection based on the QoS flow, so that different security policies can be executed for different QoS flows, thereby satisfying security requirements of different services and improving flexibility of network security.

Figure 15:
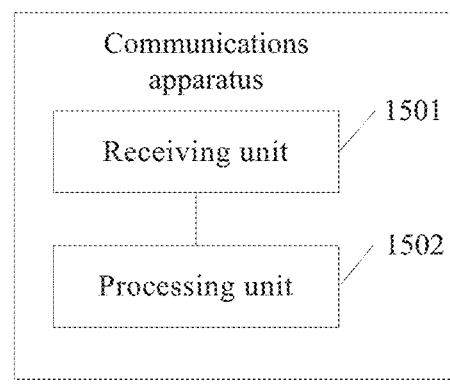
FIG. 15 is a schematic structural diagram of another communications apparatus according to an embodiment of this application.

As shown in FIG. 15, an embodiment of this application provides a communications apparatus. The communications apparatus is configured to perform the steps performed by the terminal in the foregoing method embodiments. For a method, steps, and terms in this embodiment, refer to related method embodiments. Details are not described again.

Specifically, the communications apparatus may be a terminal, or may be a system-on-a-chip or a chip. The communications apparatus includes a receiving unit 1501 and a processing unit 1502.

The receiving unit 1501 is configured to receive an identifier of a radio bearer, security information of the radio bearer, and indication information from an AN node, where the security information is used to indicate a security policy of the radio bearer, and the indication information is used to indicate a security policy of a quality of service QoS flow.

The processing unit 1502 is configured to: when the security policy of the radio bearer is the same as the security policy of the QoS flow, activate security protection for the radio bearer based on the security information; or when the security policy of the radio bearer is different from the security policy of the QoS flow, indicate, to a session management device, that the security policy of the radio bearer is different from the security policy of the QoS flow.

Optionally, the indicating, to a session management device, that the security policy of the radio bearer is different from the security policy of the QoS flow includes: sending anomaly indication information to the session management device, where the anomaly indication information is used to indicate that the security policy of the radio bearer is different from the security policy of the QoS flow.

Optionally, when the security policy of the radio bearer is different from the security policy of the QoS flow, the processing unit 1502 is further configured to activate security protection for the radio bearer based on the security information of the radio bearer.

Optionally, the apparatus further includes a sending unit 1503.

The sending unit 1503 is configured to send a security preference of a terminal to the session management device.

Optionally, the processing unit 1502 is further configured to obtain the security preference of the terminal based on security preference reference information of the terminal.

The security preference reference information may include at least one of the following: an APN of the terminal, service-related information of the terminal, a quality of service requirement of the terminal, a network status of the terminal, subscription information of the terminal, and a status of the terminal.

According to the communications apparatus provided in the foregoing embodiment, the received security policy of the radio bearer is compared with the security policy of the QoS flow. When the security policy of the radio bearer is the same as the security policy of the QoS flow, the terminal activates security protection for the radio bearer. Because the security policy of the radio bearer is set based on the security policy of the QoS flow, different security policies can be executed for different QoS flows, to implement security protection based on a QoS flow, thereby satisfying security requirements of different services. Alternatively, when the security policy of the radio bearer is different from the security policy of the QoS flow, the terminal indicates, to the session management device, that the two security policies are different, thereby ensuring that a core network, an access network, and the terminal use a same security policy for a same QoS flow.

Figure 16:
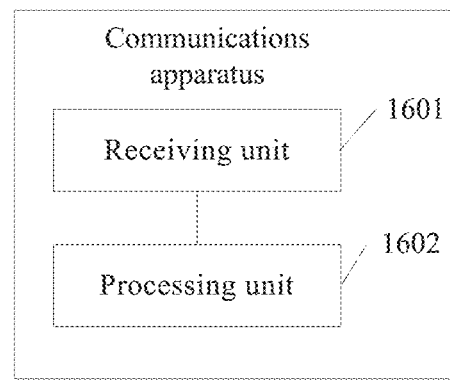
FIG. 16 is a schematic structural diagram of still another communications apparatus according to an embodiment of this application.

As shown in FIG. 16, an embodiment of this application provides another communications apparatus. The communications apparatus is configured to perform the steps performed by the PCF node in the foregoing method embodiments. For a method, steps, and terms in this embodiment, refer to related method embodiments. Details are not described again.

Specifically, the communications apparatus may be a PCF node, or may be a system-on-a-chip or a chip. The communications apparatus includes a receiving unit 1601 and a processing unit 1602.

The receiving unit 1601 is configured to receive security policy reference information from a session management device, where the security policy reference information includes at least one of a related parameter of a quality of service QoS flow and a service-related parameter.

The processing unit 1602 is configured to send a security policy to the session management device based on the security policy reference information.

Optionally, the sending a security policy to the session management device based on the security policy reference information includes:

obtaining the security policy based on a correspondence between a related parameter of the QoS flow and a security policy; or obtaining the security policy based on a correspondence between a service-related parameter and a security policy; or sending the security policy reference information to an application device, and receiving the security policy from the application device.

The related parameter of the QoS flow may include at least one of a QFI, a QCI, a 5QI, and an ARP; or the service-related parameter includes at least one of a service type and a service identifier.

According to the communications apparatus provided in the foregoing embodiment, the security policy is sent to the session management device based on the security policy reference information, where the security policy is used to determine a security policy of the QoS flow. In this way, different security policies can be executed for different QoS flows, to implement security protection based on a QoS flow, thereby satisfying security requirements of different services.

An embodiment of this application provides a communications apparatus, including a processor and a memory. The memory is configured to store a program, and the processor invokes the program stored in the memory, to perform the method performed by the terminal, the session management device, the PCF node, or the access network node in the foregoing method embodiments.

In addition, the communications apparatus may be a system-on-a-chip, a chip, or another component having this function.

In addition, when performing the method performed by the terminal, the communications apparatus may be a terminal; when performing the method performed by the session management device, the communications apparatus may be a session management device; or when performing the method performed by the access network node, the communications apparatus may be an access network node.

An embodiment of this application provides a program. When being executed by a processor, the program is used to perform the method performed by the terminal, the session management device, the PCF node, or the access network node in the foregoing method embodiments.

An embodiment of this application provides a computer readable storage medium, including the foregoing program.

An embodiment of this application provides a system, including a session management device and an access network node. The session management device is configured to perform the method performed by the session management device in the method embodiment shown in FIG. 2, and the access network node may be configured to perform the method performed by the access network node in the embodiment shown in FIG. 3 or FIG. 3a.

Further, the system may include a terminal. Correspondingly, the terminal may be configured to perform the method performed by the terminal in the embodiment shown in FIG. 3 or FIG. 3a.

In addition, the system may further include a mobility management device. The mobility management device is used for communication between the access network node and the session management device.

Further, the system may include a PCF node. The PCF node may be configured to perform the method performed by the PCF node in the embodiment shown in FIG. 4.

An embodiment of the present disclosure provides another system, including an access network node. The access network node may be configured to perform the method performed by the access network node in any one of the embodiments shown in FIG. 7 to FIG. 7f and FIG. 8.

Optionally, the system further includes a UPF node. The UPF node may be configured to perform the method performed by the UPF node corresponding to the access network node in one of the embodiments shown in FIG. 7 to FIG. 7f and FIG. 8.

Optionally, the system further includes a terminal. Correspondingly, the terminal may be configured to perform the method performed by the terminal corresponding to the access network node in any one of the embodiments shown in FIG. 7 to FIG. 7f and FIG. 8.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, some or all of the procedures or functions according to the embodiments of the present disclosure are generated. The computer may be a general-purpose computer, a special-purpose computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A communication method, comprising:
receiving, by a terminal, an identifier of a radio bearer, security information of the radio bearer, and indication information from an access network (AN) node, the security information being indicative of a security policy of the radio bearer, and the indication information being indicative of a security policy of a quality of service (QoS) flow; and
in response to a determination that the security policy of the radio bearer is the same as the security policy of the QoS flow, activating, by the terminal, security protection for the radio bearer based on the security information.

2. The method according to claim 1, further comprising:
in response to a determination that the security policy of the radio bearer is different from the security policy of the QoS flow, indicating, by the terminal to a session management device, that the security policy of the radio bearer is different from the security policy of the QoS flow, the indicating comprising:
sending, by the terminal, anomaly indication information to the session management device, wherein the anomaly indication information indicates the security policy of the radio bearer is different from the security policy of the QoS flow.

3. The method according to claim 2, wherein the method further comprises:
activating, by the terminal, security protection for the radio bearer based on in response to the determination that the security policy of the radio bearer is different from the security policy of the QoS flow.

4. The method according to claim 1, further comprising:
sending, by the terminal, a security preference of the terminal to the session management device.

5. The method according to claim 4, further comprising:
obtaining, by the terminal, the security preference of the terminal based on security preference reference information of the terminal.

6. The method according to claim 5, wherein the security preference reference information comprises at least one of an access point name (APN) of the terminal, service-related information of the terminal, a quality of service requirement of the terminal, a network status of the terminal, subscription information of the terminal, or a status of the terminal.

7. A communications apparatus, comprising:
one or more processors; and
a memory having computer-readable instructions stored thereon that, when executed by the one or more processors, cause the communications apparatus to:
receive an identifier of a radio bearer, security information of the radio bearer, and indication information from an access network (AN) node through the communications interface, the security information being indicative of a security policy of the radio bearer, and the indication information being indicative of a security policy of a quality of service (QoS) flow; and
in response to a determination that the security policy of the radio bearer is the same as the security policy of the QoS flow, activate security protection for the radio bearer based on the security information.

8. The communications apparatus according to claim 7, wherein the communications apparatus is further caused to:
in response to a determination that the security policy of the radio bearer is different from the security policy of the QoS flow, indicate to a session management device that the security policy of the radio bearer is different from the security policy of the QoS flow by sending anomaly indication information to the session management device, wherein the anomaly indication information indicates that the security policy of the radio bearer is different from the security policy of the QoS flow.

9. The communications apparatus according to claim 8, wherein the communications apparatus is further caused to:
activate security protection for the radio bearer in response to the determination that the security policy of the radio bearer is different from the security policy of the QoS flow.

10. The communications apparatus according to claim 7, wherein the communications apparatus is further caused to:
obtain a security preference of a terminal; and
send the security preference of the terminal to the session management device through the communications interface.

11. The communications apparatus according to claim 10, wherein communications apparatus is further caused to:
obtain the security preference of the terminal based on security preference reference information of the terminal.

12. The communications apparatus according to claim 11, wherein the security preference reference information comprises at least one of an access point name (APN) of the terminal, service-related information of the terminal, a quality of service requirement of the terminal, a network status of the terminal, subscription information of the terminal, or a status of the terminal.

13. A non-transitory computer-readable medium storing computer instructions, that when executed by one or more processors, cause an apparatus to:
receive an identifier of a radio bearer, security information of the radio bearer, and indication information from an access network (AN) node, the security information being indicative of a security policy of the radio bearer, and the indication information being indicative of a security policy of a quality of service (QoS) flow; and
in response to a determination that the security policy of the radio bearer is the same as the security policy of the QoS flow, activate security protection for the radio bearer based on the security information.

14. The non-transitory computer-readable medium according to claim 13, wherein the apparatus is further caused to:
in response to a determination that the security policy of the radio bearer is different from the security policy of the QoS flow, indicate to a session management device that the security policy of the radio bearer is different from the security policy of the QoS flow by sending anomaly indication information to the session management device, wherein the anomaly indication information indicates that the security policy of the radio bearer is different from the security policy of the QoS flow.

15. The non-transitory computer-readable medium according to claim 14, the communications apparatus is further caused to:
activate security protection for the radio bearer in response to the determination that the security policy of the radio bearer is different from the security policy of the QoS flow.

16. The non-transitory computer-readable medium according to claim 13, wherein the communications apparatus is further caused to:
- obtain a security preference of a terminal; and
- send the security preference of the terminal to the session management device through the communications interface.

17. The non-transitory computer-readable medium according to claim 16, wherein communications apparatus is further caused to:
- obtain the security preference of the terminal based on security preference reference information of the terminal.

18. A communication method, comprising:
- receiving, by a terminal, an identifier of a radio bearer, security information of the radio bearer, and indication information from an access network (AN) node, the security information being indicative of a security policy of the radio bearer, and the indication information being indicative of a security policy of a quality of service (QoS) flow;
- in response to a determination that the security policy of the radio bearer is the same as the security policy of the QoS flow, activating, by the terminal, security protection for the radio bearer based on the security information; and
- in response to a determination that the security policy of the radio bearer is different from the security policy of the QoS flow, indicating, by the terminal, to a session management device that the security policy of the radio bearer is different from the security policy of the QoS flow, and activating, by the terminal, security protection for the radio bearer.

19. A communications apparatus, comprising:
- one or more processors; and
- a memory having computer-readable instructions stored thereon that, when executed by the one or more processors, cause the communications apparatus to:
  - receive an identifier of a radio bearer, security information of the radio bearer, and indication information from an access network (AN) node through the communications interface, the security information being indicative of a security policy of the radio bearer, and the indication information being indicative of a security policy of a quality of service (QoS) flow;
  - in response to a determination that the security policy of the radio bearer is the same as the security policy of the QoS flow, activate security protection for the radio bearer based on the security information; and
  - in response to a determination that the security policy of the radio bearer is different from the security policy of the QoS flow, indicate to a session management device that the security policy of the radio bearer is different from the security policy of the QoS flow, and activate security protection for the radio bearer.

20. A non-transitory computer-readable medium storing computer instructions, that when executed by one or more processors, cause an apparatus to:
- receive an identifier of a radio bearer, security information of the radio bearer, and indication information from an access network (AN) node, the security information being indicative of a security policy of the radio bearer, and the indication information being indicative of a security policy of a quality of service (QoS) flow;
- in response to a determination that the security policy of the radio bearer is the same as the security policy of the QoS flow, activate security protection for the radio bearer based on the security information; and
- in response to a determination that the security policy of the radio bearer is different from the security policy of the QoS flow, indicate to a session management device that the security policy of the radio bearer is different from the security policy of the QoS flow, and activate security protection for the radio bearer.

* * * * *